United States Patent
Sarkis et al.

(10) Patent No.: US 12,375,203 B2
(45) Date of Patent: Jul. 29, 2025

(54) TRANSPORT BLOCK SIZE DETERMINATION FOR SIDELINK COMMUNICATIONS

(71) Applicant: QUALCOMM Incorporated, San Diego, CA (US)

(72) Inventors: Gabi Sarkis, San Diego, CA (US); Kapil Gulati, Belle Mead, NJ (US); Shuanshuan Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/138,849

(22) Filed: Dec. 30, 2020

(65) Prior Publication Data
US 2021/0211219 A1 Jul. 8, 2021

Related U.S. Application Data

(60) Provisional application No. 62/957,037, filed on Jan. 3, 2020.

(51) Int. Cl.
*H04L 1/00* (2006.01)
*H04W 4/40* (2018.01)

(52) U.S. Cl.
CPC .......... *H04L 1/0007* (2013.01); *H04L 1/0005* (2013.01); *H04L 1/0068* (2013.01); *H04W 4/40* (2018.02)

(58) Field of Classification Search
CPC ... H04L 1/0007; H04L 1/0005; H04L 1/0068; H04W 4/40
See application file for complete search history.

(56) References Cited

U.S. PATENT DOCUMENTS

2011/0268101 A1* 11/2011 Wang ................. H04W 56/002
370/344
2017/0126378 A1* 5/2017 Luo ........................ H04L 1/0007
(Continued)

OTHER PUBLICATIONS

International Search Report and Written Opinion—PCT/US2020/067696—ISA/EPO—Apr. 30, 2021.
(Continued)

*Primary Examiner* — Samina F Choudhry
(74) *Attorney, Agent, or Firm* — Holland & Hart LLP

(57) ABSTRACT

Methods, systems, and devices for wireless communications are described. A communication device, which may be otherwise known as user equipment (UE) may support direct communications with other communications devices (e.g., direct communications between multiple UEs). Direct communications may include, but are not limited to, device-to-device (D2D) communications, vehicle-based communications, which may also be referred to as vehicle-to-everything (V2X) communications, vehicle-to-vehicle (V2V) communications, and the like. In an example of V2X communications, V2V communications, and the like, a UE may identify sidelink information for sidelink communications, encode the sidelink information for the sidelink communications based on a transport block size (TBS), determine the TBS for the sidelink information based on an overhead size of a second physical sidelink channel for communicating the sidelink information, and transmit the sidelink information on a physical sidelink channel.

30 Claims, 19 Drawing Sheets

(56) References Cited

U.S. PATENT DOCUMENTS

| | | | |
|---|---|---|---|
| 2018/0007683 A1* | 1/2018 | You | H04W 72/0466 |
| 2018/0062809 A1* | 3/2018 | Baghel | H04L 1/0061 |
| 2018/0324010 A1* | 11/2018 | Gulati | H04L 1/0011 |
| 2019/0373625 A1 | 12/2019 | Khoryaev et al. | |

OTHER PUBLICATIONS

LG Electronics: "Discussion on Physical Layer Structure for NR Sidelink", 3GPP TSG RAN WG1 #99, 3GPP Draft, R1-1913235, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 13, 2019 (Nov. 13, 2019), 36 Pages, XP051824915, Retrieved from the Internet: URL: https://ftp.3gpp.org/tsg_ran/WG1_RL1/TSGR1_99/Docs/R1-1913235.zip R1-1913235 Discussion on physical layer structure for NR sidelink.docx [retrieved on Nov. 13, 2019], Sections 2.1.1-2.1.7.

NTT DOCOMO: et al., "Sidelink Physical Layer Structure for NR V2X", 3GPP Draft, 3GPP TSG RAN WG1 #99, R1-1912880, 3rd Generation Partnership Project (3GPP), Mobile Competence Centre, 650, Route Des Lucioles, F-06921 Sophia-Antipolis Cedex, France, vol. RAN WG1, No. Reno, US, Nov. 18, 2019-Nov. 22, 2019, Nov. 9, 2019 (Nov. 9, 2019), XP051823660, 16 Pages, Retrieved from the Internet: URL: https://ftp.3gpp.org/tsg_ran/WG1_RL1/TSGR1_99/Docs/R1-1912880.zip. R1-1912880 DCM SL PHY structure fin.docx [retrieved-on Nov. 9, 2019]—subclause 2.1 TBS/MCS.

Panasonic: "Discussion on Physical Layer Structure for Sidelink in NR V2X", 3GPP Draft, 3GPP TSG RAN WG1 #99, R1-1912752, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 8, 2019 (Nov. 8, 2019), XP051820188, 11 Pages, Retrieved from the Internet: URL: https://ftp.3gpp.org/tsg_ran/WG1_RL1/TSGR1_99/Docs/R1-1912752.zip. R1-1912752.docx [retrieved on Nov. 8, 2019] Subclause 2 Discussion, section TBS determination.

Taiwan Search Report—TW109147109—TIPO—Jan. 16, 2024.

LG Electronics: "Discussion on Physical Layer Structure for NR Sidelink", 3GPP TSG RAN WG1 #99, R1-1913235, Reno, USA, Nov. 18-22, 2019, XP051824915, Nov. 13, 2019, 36 Pages.

NTT DOCOMO, Inc: "Sidelink Physical Layer Structure for NR V2X", 3GPP TSG RAN WG1 #99, R1-1912880, Reno, US, Nov. 18-22, 2019, XP051823660, Nov. 9, 2019, pp. 1-16.

Panasonic: "Discussion on Physical Layer Structure for Sidelink in NR V2X", 3GPP TSG RAN WG1 #99, R1-1912752, Reno, USA, Nov. 18-22, 2019, XP051820188, Nov. 8, 2019, pp. 1-11.

* cited by examiner

TRANSPORT BLOCK SIZE DETERMINATION FOR SIDELINK COMMUNICATIONS

CROSS REFERENCE

The present Application for Patent claims the benefit of U.S. Provisional Patent Application No. 62/957,037 by Sarkis et al., entitled "TRANSPORT BLOCK SIZE DETERMINATION FOR SIDELINK COMMUNICATIONS," filed Jan. 3, 2020, assigned to the assignee hereof, and expressly incorporated by reference in its entirety herein.

INTRODUCTION

The following relates to wireless communications, and more specifically to direct communications between communications devices in wireless communications systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some wireless communications systems may support direct communications between communications devices (e.g., direct communications between multiple UEs). Examples of direct communications may include device-to-device (D2D) communications, vehicle-based communications, which may also be referred to as vehicle-to-everything (V2X) communications, vehicle-to-vehicle (V2V) communications, and the like. As demand for communication efficiency increases, it may be desirable for some wireless communications systems to improve direct communication operations, for example, improve reliability or latency of direct communications, among other examples.

SUMMARY

A method for wireless communication is described. The method may include encoding sidelink information for sidelink communications based on a transport block size (TBS), and transmitting the encoded sidelink information on a physical sidelink channel, the TBS based on an overhead of a second physical sidelink channel for communicating the sidelink information.

An apparatus for wireless communication is described. The apparatus may include a processor, memory coupled to the processor, the processor and memory configured to encode sidelink information for sidelink communications based on a TBS, and transmit the encoded sidelink information on a physical sidelink channel, the TBS based on an overhead of a second physical sidelink channel for communicating the sidelink information.

Another apparatus for wireless communication is described. The apparatus may include means for encoding sidelink information for sidelink communications based on a TBS, and transmitting the encoded sidelink information on a physical sidelink channel, the TBS based on an overhead of a second physical sidelink channel for communicating the sidelink information.

A non-transitory computer-readable medium storing code for wireless communication is described. The code may include instructions executable by a processor to encode sidelink information for sidelink communications based on a TBS, and transmit the encoded sidelink information on a physical sidelink channel, the TBS based on an overhead of a second physical sidelink channel for communicating the sidelink information.

Some examples of the method, apparatuses, and non-transitory computer-readable medium described herein may further include operations, features, means, or instructions for determining an estimate number of REs associated with a physical resource block for sidelink communications and where the TBS may be based on the estimate number of REs associated with the physical resource block.

Some examples of the method, apparatuses, and non-transitory computer-readable medium described herein may further include operations, features, means, or instructions for determining a number of allocated physical resource blocks for the sidelink communications, determining a number of REs associated with the allocated physical resource blocks for the sidelink communications based on the number of allocated physical resource blocks or the estimate number of REs associated with the physical resource block, or both, and where the TBS may be based on the number of REs associated with the allocated physical resource blocks for the sidelink communications.

Some examples of the method, apparatuses, and non-transitory computer-readable medium described herein may further include operations, features, means, or instructions for transmitting signaling including an indication of a number of symbols to use for the TBS determination and where the TBS may be based on the signaling.

Some examples of the method, apparatuses, and non-transitory computer-readable medium described herein may further include operations, features, means, or instructions for determining a number of allocated symbols associated with the physical sidelink channel, the physical sidelink channel including a physical sidelink control channel, subtracting the number of symbols to use for the TBS determination from the number of allocated symbols associated with the physical sidelink channel, and where determining the estimate number of REs associated with the physical resource block may be based on the subtracting.

Some examples of the method, apparatuses, and non-transitory computer-readable medium described herein may further include operations, features, means, or instructions for determining the estimate number of REs associated with the physical resource block may be based on the number of symbols to use for the TBS determination.

Some examples of the method, apparatuses, and non-transitory computer-readable medium described herein may further include operations, features, means, or instructions for determining a number of REs for a first sidelink control information, subtracting the number of REs for the first sidelink control information from the number of REs associated with the allocated physical resource blocks, and where the TBS may be based on the subtracting.

In some examples of the method, apparatuses, and non-transitory computer-readable medium described herein, transmitting the sidelink information on the physical sidelink channel may include operations, features, means, or instructions for transmitting the first sidelink control information on a physical sidelink control channel based on the TBS.

Some examples of the method, apparatuses, and non-transitory computer-readable medium described herein may further include operations, features, means, or instructions for determining that a first physical sidelink channel and the second physical sidelink channel may be frequency division multiplexed, the first physical sidelink channel includes a physical sidelink shared channel and the second physical sidelink channel includes a physical sidelink control channel and where the TBS may be based on that the first physical sidelink channel and the second physical sidelink channel may be frequency division multiplexed.

Some examples of the method, apparatuses, and non-transitory computer-readable medium described herein may further include operations, features, means, or instructions for determining that the physical sidelink shared channel occupies the number of REs associated with the allocated physical resource blocks and adjusting an overhead of the physical sidelink control channel based at least in part on a value of the number of REs occupied by the physical sidelink shared channel, where the overhead of the physical sidelink control channel may be per slot.

Some examples of the method, apparatuses, and non-transitory computer-readable medium described herein may further include operations, features, means, or instructions for determining that a first physical sidelink channel and the second physical sidelink channel may be time division multiplexed, the first physical sidelink channel includes a physical sidelink shared channel and the second physical sidelink channel includes a physical sidelink control channel and where the TBS may be based on determining that the first physical sidelink channel and the second physical sidelink channel may be time division multiplexed.

Some examples of the method, apparatuses, and non-transitory computer-readable medium described herein may further include operations, features, means, or instructions for determining an overhead of the physical sidelink control channel per physical resource block based on determining that the first physical sidelink channel and the second physical sidelink channel may be time division multiplexed and where the TBS may be based on the overhead of the physical sidelink control channel being per physical resource block.

Some examples of the method, apparatuses, and non-transitory computer-readable medium described herein may further include operations, features, means, or instructions for determining a number of symbols associated with the physical sidelink control channel or the physical sidelink shared channel, or both, determining a number of symbols exclusively including the physical sidelink control channel, excluding the number of symbols exclusively including the physical sidelink control channel from the estimate number of REs associated with the physical resource block or the number of REs associated with the allocated physical resource blocks, or both, and where the TBS may be based on the excluding.

In some examples of the method, apparatuses, and non-transitory computer-readable medium described herein, the TBS may be based on the overhead of the physical sidelink control channel being per slot.

Some examples of the method, apparatuses, and non-transitory computer-readable medium described herein may further include operations, features, means, or instructions for determining a number of REs for a second sidelink control information, subtracting the number of REs for the second sidelink control information from the estimate number of REs associated with the physical resource block or the number of REs associated with the allocated physical resource blocks, or both, and where the TBS may be based on the subtracting.

Some examples of the method, apparatuses, and non-transitory computer-readable medium described herein may further include operations, features, means, or instructions for determining a control overhead associated with the second sidelink control information based on a target code rate associated with a modulation coding scheme and where the TBS may be based on the control overhead associated with the second sidelink control information.

Some examples of the method, apparatuses, and non-transitory computer-readable medium described herein may further include operations, features, means, or instructions for determining a control overhead associated with the second sidelink control information, ignoring the control overhead associated with the second sidelink control information, and where the TBS may be based on ignoring the control overhead associated with the second sidelink control information.

Some examples of the method, apparatuses, and non-transitory computer-readable medium described herein may further include operations, features, means, or instructions for identifying a modulation coding scheme for the sidelink communications, identifying a target code rate based on the modulation coding scheme for the sidelink communications, and where determining the number of REs for the second sidelink control information may be based on the target code rate.

In some examples of the method, apparatuses, and non-transitory computer-readable medium described herein, transmitting the sidelink information on the physical sidelink channel may include operations, features, means, or instructions for transmitting the second sidelink control information on a physical sidelink shared channel based on the TBS.

Some examples of the method, apparatuses, and non-transitory computer-readable medium described herein may further include operations, features, means, or instructions for transmitting signaling including an indication of an overhead value and where determining the estimate number of REs associated with the physical resource block may be based on the signaled overhead value.

Some examples of the method, apparatuses, and non-transitory computer-readable medium described herein may further include operations, features, means, or instructions for transmitting signaling including an indication of an offset overhead value relative to a demodulation reference signal pattern and where determining the estimate number of REs associated with the physical resource block may be based on the signaled offset overhead value.

Some examples of the method, apparatuses, and non-transitory computer-readable medium described herein may further include operations, features, means, or instructions for adjusting the number of REs associated with the allocated physical resource blocks for the sidelink communications to a number of REs associated with the allocated physical resource blocks for non-sidelink communications.

Some examples of the method, apparatuses, and non-transitory computer-readable medium described herein may further include operations, features, means, or instructions for determining a channel state information reference signal overhead, refraining from using the channel state information reference signal overhead from determining the estimate number of REs associated with the physical resource block or determining the number of REs associated with the allocated physical resource blocks, or both, and where the TBS may be based on the ignoring.

A method for wireless communication is described. The method may include decoding sidelink information for sidelink communications based on a TBS, and receiving the decoded sidelink information on a physical sidelink channel, the TBS based on an overhead of a second physical sidelink channel for communicating the sidelink information.

An apparatus for wireless communication is described. The apparatus may include a processor, memory coupled with the processor, the processor and memory configured to decode sidelink information for sidelink communications based on a TBS, and receive the decoded sidelink information on a physical sidelink channel, the TBS based on an overhead of a second physical sidelink channel for communicating the sidelink information.

Another apparatus for wireless communication is described. The apparatus may include means for decoding sidelink information for sidelink communications based on a TBS, and receiving the decoded sidelink information on a physical sidelink channel, the TBS based on an overhead of a second physical sidelink channel for communicating the sidelink information.

A non-transitory computer-readable medium storing code for wireless communication is described. The code may include instructions executable by a processor to decode sidelink information for sidelink communications based on a TBS, and receive the decoded sidelink information on a physical sidelink channel, the TBS based on an overhead of a second physical sidelink channel for communicating the sidelink information.

Some examples of the method, apparatuses, and non-transitory computer-readable medium described herein may further include operations, features, means, or instructions for determining an estimate number of REs associated with a physical resource block for sidelink communications and where the TBS may be based on the estimate number of REs associated with the physical resource block.

Some examples of the method, apparatuses, and non-transitory computer-readable medium described herein may further include operations, features, means, or instructions for determining a number of allocated physical resource blocks for the sidelink communications, determining a number of REs associated with the allocated physical resource blocks for the sidelink communications based on the number of allocated physical resource blocks or the estimate number of REs associated with the physical resource block, or both, and where the TBS may be based on the number of REs associated with the allocated physical resource blocks for the sidelink communications.

Some examples of the method, apparatuses, and non-transitory computer-readable medium described herein may further include operations, features, means, or instructions for determining a number of REs for a first sidelink control information, subtracting the number of REs for the first sidelink control information from the number of REs associated with the allocated physical resource blocks, and where the TBS may be based on the subtracting.

A method of wireless communication is described. The method may include identifying sidelink control information (SCI) for sidelink communications, determining a TBS for the SCI, and transmitting the SCI on a physical sidelink channel based on the TBS.

An apparatus for wireless communication is described. The apparatus may include a processor, memory coupled with the processor, and instructions stored in the memory. The instructions may be executable by the processor to cause the apparatus to identify SCI for sidelink communications, determine a TBS for the SCI, and transmit the SCI on a physical sidelink channel based on the TBS.

Another apparatus for wireless communication is described. The apparatus may include means for identifying SCI for sidelink communications, determining a TBS for the SCI, and transmitting the SCI on a physical sidelink channel based on the TBS.

A non-transitory computer-readable medium storing code for wireless communication is described. The code may include instructions executable by a processor to identify SCI for sidelink communications, determine a TBS for the SCI, and transmit the SCI on a physical sidelink channel based on the TBS.

Some examples of the method, apparatuses, and non-transitory computer-readable medium described herein may further include operations, features, means, or instructions for determining an estimate number of REs associated with a physical resource block (PRB) for the sidelink communications, where determining the TBS may be based on the estimate number of REs associated with the PRB.

Some examples of the method, apparatuses, and non-transitory computer-readable medium described herein may further include operations, features, means, or instructions for determining a number of allocated PRBs for the sidelink communications, determining a number of REs associated with the PRB for the sidelink communications based on the number of allocated PRBs or the estimate number of REs associated with the PRB, or both, where determining the TBS may be based on the number of REs associated with the PRB for the sidelink communications.

Some examples of the method, apparatuses, and non-transitory computer-readable medium described herein may further include operations, features, means, or instructions for determining a number of REs for a first SCI, subtracting the number of REs for the first SCI from the estimate number of REs associated with the PRB or the number of REs associated with the PRB, or both, where determining the TBS may be based on the subtracting.

Some examples of the method, apparatuses, and non-transitory computer-readable medium described herein may further include operations, features, means, or instructions for determining control overhead associated with the first SCI, refraining from using the control overhead in the estimate number of REs associated with the PRB or the number of REs associated with the PRB, or both, where determining the TBS may be based on the refraining.

In some examples of the method, apparatuses, and non-transitory computer-readable medium described herein, transmitting the SCI on the physical sidelink channel may include operations, features, means, or instructions for transmitting the first SCI on a physical sidelink control channel (PSCCH) based on the TBS.

Some examples of the method, apparatuses, and non-transitory computer-readable medium described herein may further include operations, features, means, or instructions for determining that a first physical sidelink channel and a second physical sidelink channel may be frequency division multiplexed, the first physical sidelink channel includes a physical sidelink shared channel (PSSCH) and the second physical sidelink channel includes a PSCCH, where determining the TBS may be based on that the first physical sidelink channel and the second physical sidelink channel may be frequency division multiplexed.

Some examples of the method, apparatuses, and non-transitory computer-readable medium described herein may further include operations, features, means, or instructions for determining that PSSCH occupies the number of REs associated with the PRB, and scaling an overhead of the PSCCH by a value of the REs occupied by the PSSCH.

Some examples of the method, apparatuses, and non-transitory computer-readable medium described herein may further include operations, features, means, or instructions for determining the TBS may be based on the overhead of the PSCCH per slot.

Some examples of the method, apparatuses, and non-transitory computer-readable medium described herein may further include operations, features, means, or instructions for determining that a first physical sidelink channel and a second physical sidelink channel may be time division multiplexed, the first physical sidelink channel includes a PSSCH and the second physical sidelink channel includes a PSCCH, where determining the TBS may be based on that the first physical sidelink channel and the second physical sidelink channel may be time division multiplexed.

Some examples of the method, apparatuses, and non-transitory computer-readable medium described herein may further include operations, features, means, or instructions for determining an overhead of the PSCCH per PRB based on that the first sidelink channel and the second physical sidelink channel may be time division multiplexed, where determining the TBS may be based on the overhead of the PSCCH per PRB.

Some examples of the method, apparatuses, and non-transitory computer-readable medium described herein may further include operations, features, means, or instructions for determining a number of symbols associated with the PSCCH or the PSSCH, or both, determining a number of symbols exclusively including the PSCCH, excluding the number of symbols exclusively including the PSCCH from the estimate number of REs associated with the PRB or the number of REs associated with the PRB, or both, where determining the TBS may be based on the excluding.

Some examples of the method, apparatuses, and non-transitory computer-readable medium described herein may further include operations, features, means, or instructions for determining the TBS may be based on an overhead of the PSCCH per slot.

Some examples of the method, apparatuses, and non-transitory computer-readable medium described herein may further include operations, features, means, or instructions for determining a number of REs for a second SCI, subtracting the number of REs for the second SCI from the estimate number of REs associated with the PRB or the number of REs associated with the PRB, or both, where determining the TBS may be based on the subtracting.

Some examples of the method, apparatuses, and non-transitory computer-readable medium described herein may further include operations, features, means, or instructions for determining a control overhead associated with the second SCI based on a target code rate associated with a modulation coding scheme, where determining the TBS may be based on the control overhead associated with the second SCI.

Some examples of the method, apparatuses, and non-transitory computer-readable medium described herein may further include operations, features, means, or instructions for ignoring the control overhead associated with the second SCI, where determining the TBS may be based on ignoring the control overhead associated with the second SCI.

Some examples of the method, apparatuses, and non-transitory computer-readable medium described herein may further include operations, features, means, or instructions for identifying a modulation coding scheme for the second SCI, identifying a target code rate based on the modulation coding scheme for second SCI, where determining the number of REs for the second SCI may be based on the target code rate.

In some examples of the method, apparatuses, and non-transitory computer-readable medium described herein, transmitting the SCI on the physical sidelink channel may include operations, features, means, or instructions for transmitting the second SCI on a PSSCH based on the TBS.

Some examples of the method, apparatuses, and non-transitory computer-readable medium described herein may further include operations, features, means, or instructions for transmitting signaling including an indication of an overhead value, where determining the estimate number of REs associated with the PRB may be based on the signaled overhead value.

Some examples of the method, apparatuses, and non-transitory computer-readable medium described herein may further include operations, features, means, or instructions for transmitting signaling including an indication of an offset overhead value relative to a demodulation reference signal pattern, where determining the estimate number of REs associated with the PRB may be based on the signaled offset overhead value.

Some examples of the method, apparatuses, and non-transitory computer-readable medium described herein may further include operations, features, means, or instructions for transmitting signaling including an indication of a number of symbols to use for the TBS determination, where determining the TBS may be based on the signaling.

Some examples of the method, apparatuses, and non-transitory computer-readable medium described herein may further include operations, features, means, or instructions for determining a number of allocated symbols associated with the physical sidelink channel, the physical sidelink channel including a PSCCH, subtracting the number of symbols to use for the TBS determination from the number of allocated symbols associated with the physical sidelink channel, where determining the estimate number of REs associated with the PRB may be based on the subtracting.

Some examples of the method, apparatuses, and non-transitory computer-readable medium described herein may further include operations, features, means, or instructions for determining the estimate number of REs associated with the PRB may be based on the number of symbols to use for the TBS determination.

Some examples of the method, apparatuses, and non-transitory computer-readable medium described herein may further include operations, features, means, or instructions for adjusting the number of REs associated with the PRB for the sidelink communications to a number of REs associated with the PRB for non-sidelink communications.

Some examples of the method, apparatuses, and non-transitory computer-readable medium described herein may further include operations, features, means, or instructions for determining a channel state information reference signal overhead, refraining from using the channel state information reference signal overhead from determining the estimate number of REs associated with the PRB or determining the number of REs associated with the PRB, or both, where determining the TBS may be based on the ignoring.

Some examples of the method, apparatuses, and non-transitory computer-readable medium described herein may further include operations, features, means, or instructions for determining a number of subcarriers associated with the PRB, where determining the estimate number of REs associated with the PRB may be based on the number of subcarriers associated with the PRB.

Some examples of the method, apparatuses, and non-transitory computer-readable medium described herein may further include operations, features, means, or instructions for determining a number of allocated symbols associated with a physical sidelink channel, where determining the estimate number of REs associated with the PRB may be based on one or more of the number of subcarriers associated with the PRB and the number of allocated symbols associated with the physical sidelink channel.

Some examples of the method, apparatuses, and non-transitory computer-readable medium described herein may further include operations, features, means, or instructions for determining a demodulation reference signal overhead associated with the PRB, where determining the estimate number of REs associated with the PRB may be based on the reference signal overhead associated with the PRB.

Some examples of the method, apparatuses, and non-transitory computer-readable medium described herein may further include operations, features, means, or instructions for determining control overhead associated with the PRB, where determining the estimate number of REs associated with the PRB may be based on the control overhead associated with the PRB.

Some examples of the method, apparatuses, and non-transitory computer-readable medium described herein may further include operations, features, means, or instructions for determining an overhead of the physical sidelink channel based on a period of the physical sidelink channel, where determining the TBS may be based on the overhead of the physical sidelink channel.

In some examples of the method, apparatuses, and non-transitory computer-readable medium described herein, the physical sidelink channel includes a physical sidelink feedback channel.

Some examples of the method, apparatuses, and non-transitory computer-readable medium described herein may further include operations, features, means, or instructions for scaling the overhead of the physical sidelink channel based on the period of the physical sidelink channel, where determining the TBS may be based on the scaling.

Some examples of the method, apparatuses, and non-transitory computer-readable medium described herein may further include operations, features, means, or instructions for determining an average of the overhead of the physical sidelink channel over the period of the physical sidelink channel, where determining the TBS may be based on the average of the overhead of the physical sidelink channel over the period of the physical sidelink channel.

Some examples of the method, apparatuses, and non-transitory computer-readable medium described herein may further include operations, features, means, or instructions for applying the overhead of the physical sidelink channel as a value per PRB, where determining the TBS may be based on the applying.

In some examples of the method, apparatuses, and non-transitory computer-readable medium described herein, the overhead of the physical sidelink channel corresponds to a number of available symbols of a second physical sidelink channel, the second physical sidelink channel including a PSSCH.

In some examples of the method, apparatuses, and non-transitory computer-readable medium described herein, the physical sidelink channel includes a PSSCH.

In some examples of the method, apparatuses, and non-transitory computer-readable medium described herein, the physical sidelink channel includes a PSCCH.

A method of wireless communication is described. The method may include identifying SCI for sidelink communications, determining a TBS for the SCI, and receiving the SCI on a physical sidelink channel based on the TBS.

An apparatus for wireless communication is described. The apparatus may include a processor, memory coupled with the processor, and instructions stored in the memory. The instructions may be executable by the processor to cause the apparatus to identify SCI for sidelink communications, determine a TBS for the SCI, and receive the SCI on a physical sidelink channel based on the TBS.

Another apparatus for wireless communication is described. The apparatus may include means for identifying SCI for sidelink communications, determining a TBS for the SCI, and receiving the SCI on a physical sidelink channel based on the TBS.

A non-transitory computer-readable medium storing code for wireless communication is described. The code may include instructions executable by a processor to identify SCI for sidelink communications, determine a TBS for the SCI, and receive the SCI on a physical sidelink channel based on the TBS.

Some examples of the method, apparatuses, and non-transitory computer-readable medium described herein may further include operations, features, means, or instructions for determining an estimate number of REs associated with a physical resource block (PRB) for the sidelink communications, where determining the TBS may be based on the estimate number of REs associated with the PRB.

Some examples of the method, apparatuses, and non-transitory computer-readable medium described herein may further include operations, features, means, or instructions for determining a number of allocated PRBs for the sidelink communications, determining a number of REs associated with the PRB for the sidelink communications based on the number of allocated PRBs or the estimate number of REs associated with the PRB, or both, where determining the TBS may be based on the number of REs associated with the PRB for the sidelink communications.

Some examples of the method, apparatuses, and non-transitory computer-readable medium described herein may further include operations, features, means, or instructions for determining a number of REs for a first SCI, subtracting the number of REs for the first SCI from the estimate number of REs associated with the PRB or the number of REs associated with the PRB, or both, where determining the TBS may be based on the subtracting.

Some examples of the method, apparatuses, and non-transitory computer-readable medium described herein may further include operations, features, means, or instructions for determining control overhead associated with the first SCI, refraining from using the control overhead in the estimate number of REs associated with the PRB or the number of REs associated with the PRB, or both, where determining the TBS may be based on the refraining.

In some examples of the method, apparatuses, and non-transitory computer-readable medium described herein, receiving the SCI on the physical sidelink channel may include operations, features, means, or instructions for receiving the first SCI on a PSCCH based on the TBS.

Some examples of the method, apparatuses, and non-transitory computer-readable medium described herein may further include operations, features, means, or instructions for determining that a first physical sidelink channel and a second physical sidelink channel may be frequency division multiplexed, the first physical sidelink channel includes a PSSCH and the second physical sidelink channel includes a PSCCH, where determining the TBS may be based on that the first physical sidelink channel and the second physical sidelink channel may be frequency division multiplexed.

Some examples of the method, apparatuses, and non-transitory computer-readable medium described herein may further include operations, features, means, or instructions for determining that PSSCH occupies the number of REs associated with the PRB, and scaling an overhead of the PSCCH by a value of the REs occupied by the PSSCH.

Some examples of the method, apparatuses, and non-transitory computer-readable medium described herein may further include operations, features, means, or instructions for determining the TBS may be based on the overhead of the PSCCH per slot.

Some examples of the method, apparatuses, and non-transitory computer-readable medium described herein may further include operations, features, means, or instructions for determining that a first physical sidelink channel and a second physical sidelink channel may be time division multiplexed, the first physical sidelink channel includes a PSSCH and the second physical sidelink channel includes a PSCCH, where determining the TBS may be based on that the first physical sidelink channel and the second physical sidelink channel may be time division multiplexed.

Some examples of the method, apparatuses, and non-transitory computer-readable medium described herein may further include operations, features, means, or instructions for determining an overhead of the PSCCH per PRB based on that the first sidelink channel and the second physical sidelink channel may be time division multiplexed, where determining the TBS may be based on the overhead of the PSCCH per PRB.

Some examples of the method, apparatuses, and non-transitory computer-readable medium described herein may further include operations, features, means, or instructions for determining a number of symbols associated with the PSCCH or the PSSCH, or both, determining a number of symbols exclusively including the PSCCH, excluding the number of symbols exclusively including the PSCCH from the estimate number of REs associated with the PRB or the number of REs associated with the PRB, or both, where determining the TBS may be based on the excluding.

Some examples of the method, apparatuses, and non-transitory computer-readable medium described herein may further include operations, features, means, or instructions for determining the TBS may be based on an overhead of the PSCCH per slot.

Some examples of the method, apparatuses, and non-transitory computer-readable medium described herein may further include operations, features, means, or instructions for determining a number of REs for a second SCI, subtracting the number of REs for the second SCI from the estimate number of REs associated with the PRB or the number of REs associated with the PRB, or both, where determining the TBS may be based on the subtracting.

Some examples of the method, apparatuses, and non-transitory computer-readable medium described herein may further include operations, features, means, or instructions for determining a control overhead associated with the second SCI based on a target code rate associated with a modulation coding scheme, where determining the TBS may be based on the control overhead associated with the second SCI.

Some examples of the method, apparatuses, and non-transitory computer-readable medium described herein may further include operations, features, means, or instructions for ignoring the control overhead associated with the second SCI, where determining the TBS may be based on ignoring the control overhead associated with the second SCI.

Some examples of the method, apparatuses, and non-transitory computer-readable medium described herein may further include operations, features, means, or instructions for identifying a modulation coding scheme for the second SCI, identifying a target code rate based on the modulation coding scheme for second SCI, where determining the number of REs for the second SCI may be based on the target code rate.

In some examples of the method, apparatuses, and non-transitory computer-readable medium described herein, receiving the SCI on the physical sidelink channel may include operations, features, means, or instructions for receiving the second SCI on a PSSCH based on the TBS.

Some examples of the method, apparatuses, and non-transitory computer-readable medium described herein may further include operations, features, means, or instructions for receiving signaling including an indication of an overhead value, where determining the estimate number of REs associated with the PRB may be based on the signaled overhead value.

Some examples of the method, apparatuses, and non-transitory computer-readable medium described herein may further include operations, features, means, or instructions for receiving signaling including an indication of an offset overhead value relative to a demodulation reference signal pattern, where determining the estimate number of REs associated with the PRB may be based on the signaled offset overhead value.

Some examples of the method, apparatuses, and non-transitory computer-readable medium described herein may further include operations, features, means, or instructions for receiving signaling including an indication of a number of symbols to use for the TBS determination, where determining the TBS may be based on the signaling.

Some examples of the method, apparatuses, and non-transitory computer-readable medium described herein may further include operations, features, means, or instructions for determining a number of allocated symbols associated with the physical sidelink channel, the physical sidelink channel including a PSCCH, subtracting the number of symbols to use for the TBS determination from the number of allocated symbols associated with the physical sidelink channel, where determining the estimate number of REs associated with the PRB may be based on the subtracting.

Some examples of the method, apparatuses, and non-transitory computer-readable medium described herein may further include operations, features, means, or instructions for determining the estimate number of REs associated with the PRB may be based on the number of symbols to use for the TBS determination.

Some examples of the method, apparatuses, and non-transitory computer-readable medium described herein may further include operations, features, means, or instructions for adjusting the number of REs associated with the PRB for the sidelink communications to a number of REs associated with the PRB for non-sidelink communications.

Some examples of the method, apparatuses, and non-transitory computer-readable medium described herein may further include operations, features, means, or instructions for determining a channel state information reference signal overhead, refraining from using the channel state information reference signal overhead from determining the estimate number of REs associated with the PRB or determining the number of REs associated with the PRB, or both, where determining the TBS may be based on the ignoring.

Some examples of the method, apparatuses, and non-transitory computer-readable medium described herein may further include operations, features, means, or instructions for determining a number of subcarriers associated with the PRB, where determining the estimate number of REs associated with the PRB may be based on the number of subcarriers associated with the PRB.

Some examples of the method, apparatuses, and non-transitory computer-readable medium described herein may further include operations, features, means, or instructions for determining a number of allocated symbols associated with a physical sidelink channel, where determining the estimate number of REs associated with the PRB may be based on one or more of the number of subcarriers associated with the PRB and the number of allocated symbols associated with the physical sidelink channel.

Some examples of the method, apparatuses, and non-transitory computer-readable medium described herein may further include operations, features, means, or instructions for determining a demodulation reference signal overhead associated with the PRB, where determining the estimate number of REs associated with the PRB may be based on the reference signal overhead associated with the PRB.

Some examples of the method, apparatuses, and non-transitory computer-readable medium described herein may further include operations, features, means, or instructions for determining control overhead associated with the PRB, where determining the estimate number of REs associated with the PRB may be based on the control overhead associated with the PRB.

Some examples of the method, apparatuses, and non-transitory computer-readable medium described herein may further include operations, features, means, or instructions for determining an overhead of the physical sidelink channel based on a period of the physical sidelink channel, where determining the TBS may be based on the overhead of the physical sidelink channel.

In some examples of the method, apparatuses, and non-transitory computer-readable medium described herein, the physical sidelink channel includes a physical sidelink feedback channel.

Some examples of the method, apparatuses, and non-transitory computer-readable medium described herein may further include operations, features, means, or instructions for scaling the overhead of the physical sidelink channel based on the period of the physical sidelink channel, where determining the TBS may be based on the scaling.

Some examples of the method, apparatuses, and non-transitory computer-readable medium described herein may further include operations, features, means, or instructions for determining an average of the overhead of the physical sidelink channel over the period of the physical sidelink channel, where determining the TBS may be based on the average of the overhead of the physical sidelink channel over the period of the physical sidelink channel.

Some examples of the method, apparatuses, and non-transitory computer-readable medium described herein may further include operations, features, means, or instructions for applying the overhead of the physical sidelink channel as a value per PRB, where determining the TBS may be based on the applying.

In some examples of the method, apparatuses, and non-transitory computer-readable medium described herein, the overhead of the physical sidelink channel corresponds to a number of available symbols of a second physical sidelink channel, the second physical sidelink channel including a PSSCH.

In some examples of the method, apparatuses, and non-transitory computer-readable medium described herein, the physical sidelink channel includes a PSSCH.

In some examples of the method, apparatuses, and non-transitory computer-readable medium described herein, the physical sidelink channel includes a PSCCH.

A method of wireless communication is described. The method may include allocating resources for sidelink communications on a physical sidelink channel, transmitting, based on the allocating, signaling including an indication of the resources for the sidelink communications, and receiving SCI on the physical sidelink channel based on the signaling, where TBS for the SCI is determined based on the indication of the resources for the sidelink communications.

An apparatus for wireless communication is described. The apparatus may include a processor, memory coupled with the processor, and instructions stored in the memory. The instructions may be executable by the processor to cause the apparatus to allocate resources for sidelink communications on a physical sidelink channel, transmit, based on the allocating, signaling including an indication of the resources for the sidelink communications, and receive SCI on the physical sidelink channel based on the signaling, where TBS for the SCI is determined based on the indication of the resources for the sidelink communications.

Another apparatus for wireless communication is described. The apparatus may include means for allocating resources for sidelink communications on a physical sidelink channel, transmitting, based on the allocating, signaling including an indication of the resources for the sidelink communications, and receiving SCI on the physical sidelink channel based on the signaling, where TBS for the SCI is determined based on the indication of the resources for the sidelink communications.

A non-transitory computer-readable medium storing code for wireless communication is described. The code may include instructions executable by a processor to allocate resources for sidelink communications on a physical sidelink channel, transmit, based on the allocating, signaling including an indication of the resources for the sidelink communications, and receive SCI on the physical sidelink channel based on the signaling, where TBS for the SCI is determined based on the indication of the resources for the sidelink communications.

In some examples of the method, apparatuses, and non-transitory computer-readable medium described herein, transmitting the signaling may include operations, features, means, or instructions for transmitting signaling including an indication of an overhead value, where an estimate number of REs associated with a PRB for the sidelink communications may be based on the signaled overhead value.

In some examples of the method, apparatuses, and non-transitory computer-readable medium described herein, transmitting the signaling may include operations, features, means, or instructions for transmitting signaling including an indication of a number of symbols to use for the TBS determination, where the TBS may be based on the number of symbols to use for the TBS determination.

In some examples of the method, apparatuses, and non-transitory computer-readable medium described herein, the physical sidelink channel includes a PSSCH.

In some examples of the method, apparatuses, and non-transitory computer-readable medium described herein, the physical sidelink channel includes a PSCCH.

DETAILED DESCRIPTION

Figure 1:
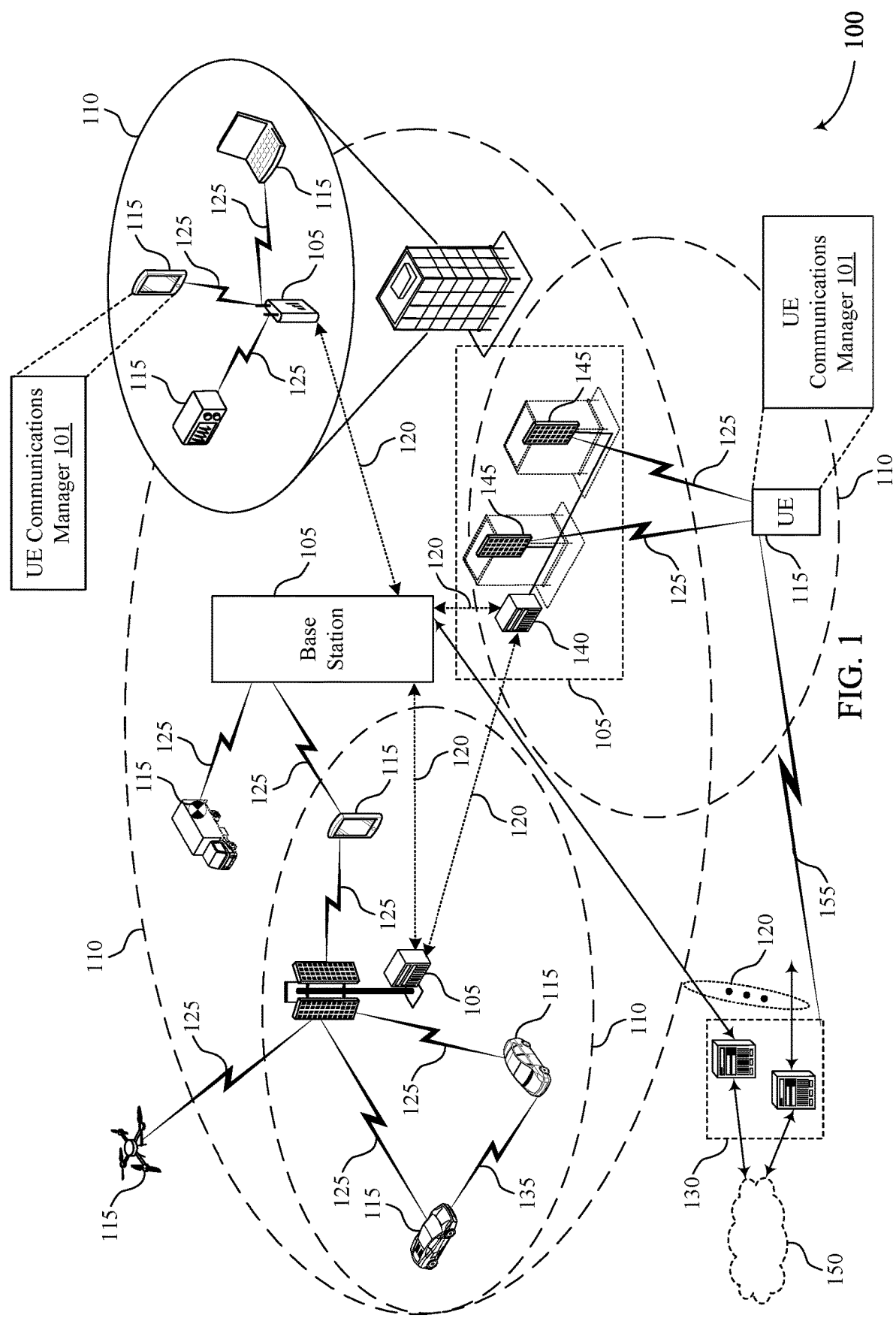
FIGS. 1 and 2 illustrate examples of wireless communications systems that support sidelink communications in accordance with one or more aspects of the present disclosure.

Wireless communications systems may include multiple communication devices such as UEs and base stations, which may provide wireless communication services to the UEs. For example, such base stations may be next-generation NodeBs or giga-NodeBs (either of which may be referred to as a gNB) that may support multiple radio access technologies including 4G systems, such as LTE systems, as well as 5G systems, which may be referred to as NR systems. Some wireless communications systems may also provide direct communications between multiple UEs. Examples of direct communications may include, but are not limited to, D2D communications, vehicle-based communications, which may also be referred to as V2X communications systems, V2V communications systems, etc. In an example of a V2X communication system or a V2V communication system, a vehicle may communicate SCI and sidelink data to indicate to other vehicles information relevant to the other vehicles. For example, a UE may indicate to other UEs in the V2X or V2V system, resources in time and frequency that are occupied by the UE. In some cases, UEs (e.g., vehicles) in these communication systems may less effectively communicate the SCI or the sidelink data, or both due to a change in time and frequency resources of the communication systems among other factors.

As demand for communication efficiency increases, in some wireless communications systems, it may be desirable to provide satisfactory direct communications, and as a result, support high reliability or low latency direct communications, among other examples. The described techniques may be used to configure UEs to determine TBS for SCI and sidelink data in wireless communication systems that support direct communications, such as in V2X communications systems, V2V communications systems, etc. For example, various aspects of the described techniques relate to configuring UEs to determine a TBS for direct communications, such as sidelink communications and such systems may benefit from improved techniques for TBS determination for sidelink communications which may provide for flexible TB S determination under a number of conditions or in a number of situations as described herein. For example, a vehicle in a V2X communication system may determine a TBS to transmit an SCI message (e.g., an SCI-1, an SCI-2) over a PSCCH or a PSSCH, or both to other vehicles under a number of conditions or in a number of situations where the TBS may be the same for an initial transmission and a re-transmission of a same transport block.

For example, various aspects of the described techniques relate to configuring one or more UEs to determine a TBS for sidelink communications when a demodulation reference signal (DMRS) pattern is dynamically-indicated. In some other examples, various aspects of the described techniques relate to configuring one or more UEs to determine a TBS for sidelink communications depending on a presence or an absence of a physical sidelink feedback channel (PSFCH). In other examples, various aspects of the described techniques relate to configuring one or more UEs to determine a TBS for sidelink communications depending on a second stage control (SCI-2) (e.g., based on a modulation and coding scheme (MCS) and a scaling factor). In some other examples, various aspects of the described techniques relate to configuring one or more UEs to determine a TBS for sidelink communications depending on CSI-RS. In other words, various aspects of the described techniques may account for changing conditions in which a UE may transmit sidelink information and flexible determination of TBS may enhance reliability under such conditions.

In some examples, the TBS for sidelink communications may be determined based on an overhead of a physical sidelink channel. For example, the TBS may be determined based on an overhead (e.g., resource elements dedicated to control, signaling, or synchronization tasks, among other examples, at the physical layer) associated with a physical sidelink control channel (PSCCH) or a physical sidelink shared channel (PSSCH). For example, the TBS may be determined based on an overhead of the PSCCH on a per-PRB basis or, as another example on a per-slot basis, among other examples.

Particular aspects of the subject matter described in this disclosure may be implemented to realize one or more of the following potential advantages, among others. The techniques employed by UEs may provide benefits and enhancements to the operation of the UEs. For example, operations performed by the UEs may provide improvements to sidelink operations. In some examples, configuring the UEs to support TBS determination for sidelink communications may support improvements to power consumption, spectral efficiency, higher data rates and, in some examples, may promote enhanced efficiency for sidelink communication operations, among other benefits.

Aspects of the disclosure are initially described in the context of wireless communications systems. Aspects of the disclosure are further illustrated by and described with reference to apparatus diagrams, system diagrams, and flowcharts that relate to TBS determination for sidelink communications.

FIG. 1 illustrates an example of a wireless communications system 100 that supports sidelink communications in accordance with one or more aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples, the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a RE may consist of one symbol period (e.g., a duration of one modulation symbol) and one subcarrier, e.g., with a PRB, where the symbol period and subcarrier spacing are inversely related and the PRB may include or consist of a plurality of REs. The number of bits carried by each RE may depend on the modulation scheme (e.g., the order of the modulation scheme, the coding rate of the modulation scheme, or both). Thus, the more REs that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $\Delta f_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. A UE 115 may identify SCI for sidelink communications, determine a TBS for the SCI, and transmit the SCI on a physical sidelink channel based on the TBS. One or more of these operations may be performed by a UE communications manager 101, which may be an example of a UE communications manager 515, 615, 705, or 810 as described with reference to FIGS. 5 through 8. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
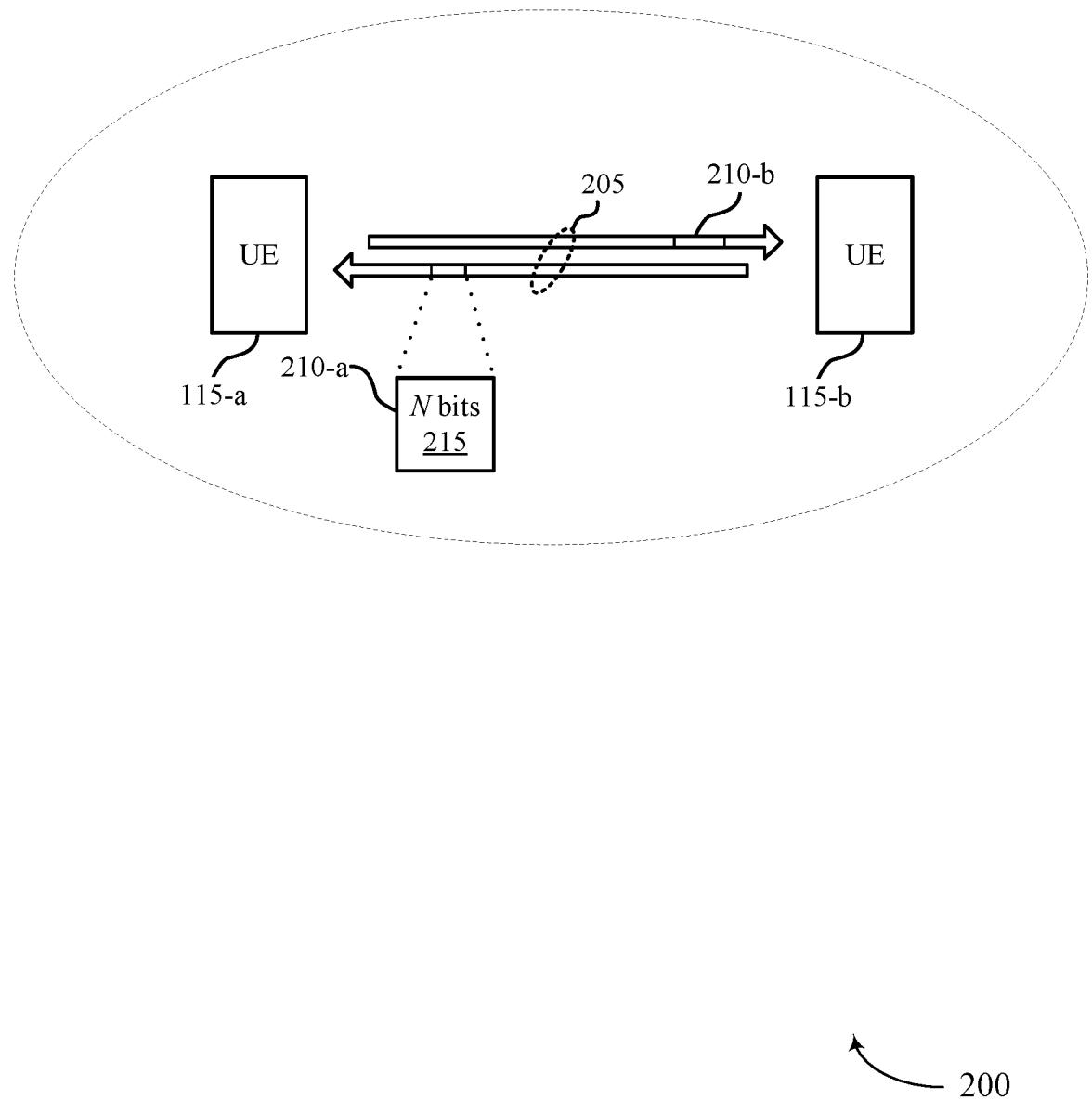

FIG. 2 illustrates an example of a wireless communications system 200 that supports sidelink communications in accordance with one or more aspects of the present disclosure. In some examples, the wireless communications system 200 may implement aspects of the wireless communications system 100. For example, the wireless communications system 200 may include multiple UEs, such as a UE 115-a and a UE 115-b, which may be examples of the corresponding devices described with reference to FIG. 1. In some examples, the wireless communications system 200 may support multiple radio access technologies including 4G systems such as LTE systems, LTE-A systems, or LTE-A Pro systems, and 5G systems which may be referred to as NR systems. The wireless communications system 200 may support improvements to power consumption, spectral efficiency, higher data rates and, in some examples, may promote enhanced efficiency for high reliability and low latency direct communications operations, among other benefits.

The wireless communications system 200 may, in some examples, support direct communications between multiple UEs, such as the UE 115-a and the UE 115-b. For example, the UE 115-a may be able to communicate directly with the UE 115-b (e.g., other UEs) over a D2D communication link 205 (e.g., using a P2P or D2D protocol). In some examples, the D2D communication link 205 may be an example of a communication channel, such as a sidelink communication channel, between vehicles (e.g., UEs 115). The sidelink communication channel may correspond to a PC5 interface between the UE 115-a and the UE 115-b. The PC5 interface may facilitate direct communications between at least two UEs without involving a network infrastructure (e.g., a base station (e.g., an eNB, a next-generation NodeB or giga-NodeB (either of which may be referred to as a gNB), and the like). The PC5 interface may also be a one-to-many communication interface (i.e., may be specified for group communications).

In some examples, multiple vehicles (e.g., the UE 115-a, the UE 115-b) may communicate using V2X communications, V2V communications, or some combination of these. A vehicle may signal information related to traffic conditions, signal scheduling, weather, safety, emergencies, or any other information relevant to a V2X communication system. For example, the UE 115-a may signal SCI and sidelink data relevant to a V2X communication system to the UE 115-b using one or more physical sidelink channels. Examples of physical sidelink channels may include a PSCCH and a PSSCH. In some examples, vehicles in a V2X communication system may communicate with roadside infrastructure, such as roadside units, or with a network via one or more network nodes (e.g., base stations 105) using vehicle-to-network (V2N) communications, or with both.

An example of a physical layer structure for direct communications, such as sidelink communications is described with reference to FIG. 3.

Figure 3:
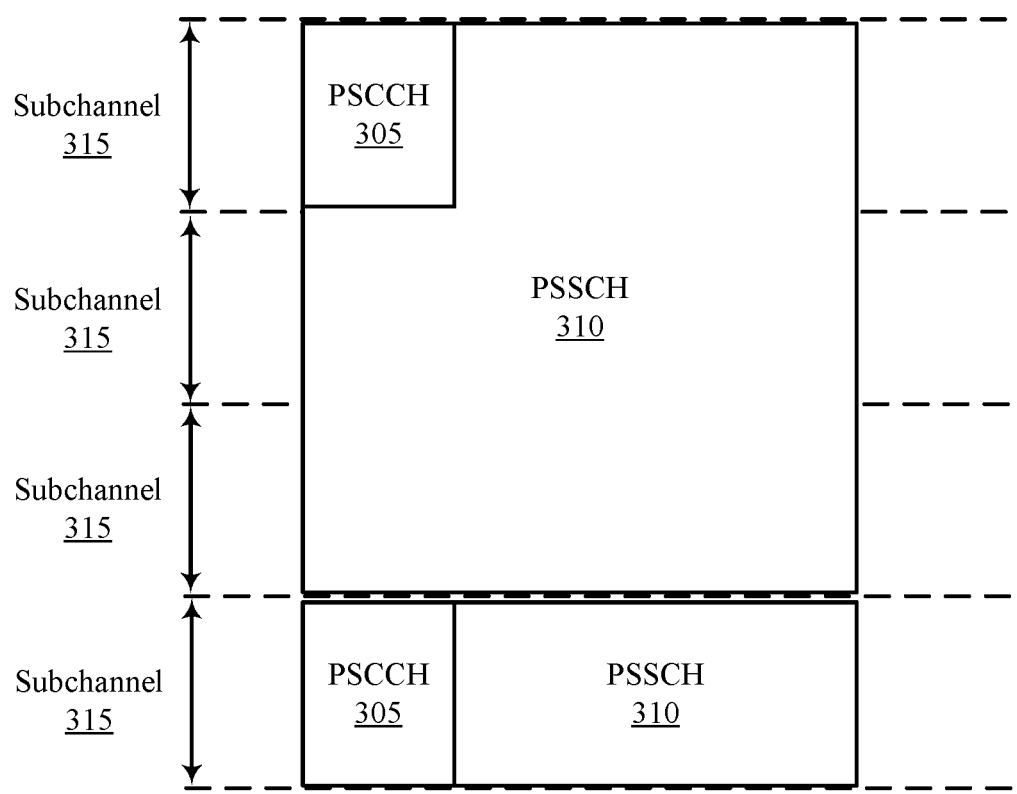
FIGS. 3 through 6 illustrate examples of block diagrams that support sidelink communications in accordance with one or more aspects of the present disclosure.

FIG. 3 illustrates an example of a block diagram 300 that supports sidelink communications in accordance with one or more aspects of the present disclosure. The block diagram 300 may implement aspects of the wireless communications system 100 and 200 described with reference to FIGS. 1 and 2, respectively. For example, the block diagram 300 may be based on a configuration by a UE 115, and implemented by the UE 115. In the example illustrated in FIG. 3, the block diagram 300 may be applicable to implementations or instances when the UE 115 is configured with direct communication operations, such as sidelink communication operations in V2X and V2V communication systems. For example, the block diagram 300 may include a PSCCH 305 and a PSSCH 310, which may correspond to time resources (for example, a symbol, a minislot, a slot, a subframe, a frame), as well as frequency resources (for example, subcarriers, carriers). In some examples, the PSCCH 305 may correspond to a number of symbols in a time domain, for example, such as two or three symbols. Similarly, the PSSCH 310 may correspond to a number of symbols in a time domain.

The PSCCH 305 may be associated with the PSSCH 310. In some examples, the PSCCH 305 and the PSSCH 310 may be frequency division multiplexed and transmitted (and/or received) in a same time resource (e.g., a slot). In some other examples, the PSCCH 305 and the PSSCH 310 may be time division multiplexed and transmitted (and/or received) in a same frequency resource (e.g., a subchannel). With reference to FIG. 2, in the example of direct communications, vehicles may communicate using V2X communications, V2V communications, or some combination of these according to time and frequency resources of a resource pool (also referred to as a sidelink resource pool). The resource pool may be divided over one or more of time resources or frequency resources for direct communications between the UE 115-a and the UE 115-b, for example, such as sidelink communications. The time resources of the resource pool may be divided into slots, and the frequency resources of the resource pool may be divided into subchannels.

In the example illustrated in FIG. 3, the PSCCH 305 may span a single subchannel 315, while the PSSCH 310 may span multiple subchannels 315. A subchannel 315 may occupy a number of physical resource blocks (PRBs). For example, a subchannel 315 may occupy 10 PRBs, 15 PRBs, 20 PRBs, 25 PRBs, 50 PRBs, 75 PRBs, or 100 PRBs. The PSCCH 305 may also occupy a number of PRBs. For example, the PSCCH 305 may occupy 10 PRBs, 12 PRBs, 15 PRBs, 20 PRBs, or 25 PRBs. When the PSCCH 305 and a subchannel 315 occupy a same number of PRBs, and the PSCCH 305 spans a single subchannel 315, the PSCCH 305 and the PSSCH 310 may be time division multiplexed.

Returning to FIG. 2, in some examples, a vehicle (e.g., the UE 115-a) in a V2X communication system may communicate sidelink information such as SCI, which may carry information that other vehicles (e.g., the UE 115-b) may use in order to receive sidelink data (e.g., information related to traffic conditions, signal scheduling, weather, safety, emergencies, or any other information relevant to a V2X communication system) from the vehicle. For example, the vehicle (e.g., the UE 115-a) in the V2X communication system may transmit (or receive) an SCI message on a PSCCH, and the SCI message may include information about resource allocation of a PSSCH, which carries sidelink data. In some examples, transmission of the SCI may include multiple stages. For example, a vehicle (e.g., the UE 115-*a*) in a V2X communication system may transmit (or receive) a first SCI (SCI-1) on a PSCCH and a second SCI (SCI-2) on a PSSCH to another vehicle (e.g., the UE 115-*b*). In some examples, a vehicle (e.g., the UE 115-*a*) in a V2X communication system may map contiguous RBs of the SCI-2 in a frequency domain before mapping contiguous RBs of the SCI-2 in a time domain. The PSSCH may be mapped to one or two layers (e.g., higher layers, physical layers, V2X layers). When the PSCCH is mapped to two layers, symbols of the SCI-2 may be repeated across both layers.

A vehicle (e.g., the UE 115-*a*) in a V2X communication system may communicate SCI to other vehicles (e.g., the UE 115-*b*) according to a DMRS pattern. In some examples, a DMRS pattern may span two, three, or four symbols. In other words, there may be two, three, or four-symbol DMRS patterns. A vehicle (e.g., the UE 115-*a*) may signal the DMRS pattern in the SCI to other vehicles (e.g., the UE 115-*b*). The other vehicles (e.g., the UE 115-*b*) may use DMRSs of the DMRS pattern as a reference for channel estimation and demodulation of the PSSCH. In some examples, vehicles in a V2X communication system may support (re)transmission of sidelink data to increase the likelihood that the sidelink data is received successfully. HARQ feedback may be one technique for increasing the likelihood that the sidelink data is received correctly over the D2D communication link 205. HARQ may include a combination of error detection (e.g., using a CRC), FEC, and (re)transmission (e.g., ARQ). In some examples, vehicles in a V2X communication system may provide HARQ feedback via a physical feedback channel. For example, the physical feedback channel may be a PSFCH. An example of a physical layer structure for direct communications, such as sidelink communications is described with reference to FIG. 4.

Figure 4:
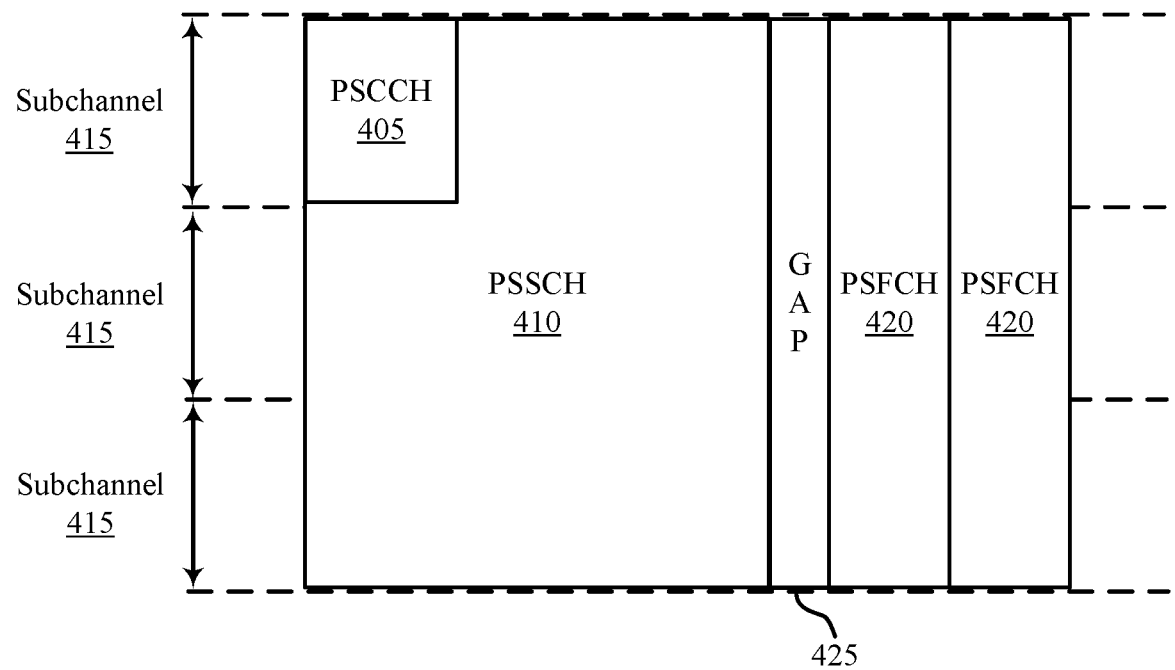
Figure 4:
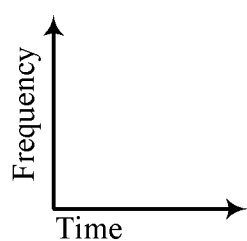

FIG. 4 illustrates an example of a block diagram 400 that supports sidelink communications in accordance with one or more aspects of the present disclosure. The block diagram 400 may implement aspects of the wireless communications system 100 and 200 described with reference to FIGS. 1 and 2, respectively. For example, the block diagram 400 may be based on a configuration by a UE 115, and implemented by the UE 115. In the example illustrated in FIG. 4, the block diagram 400 may be applicable to implementations or instances when the UE 115 is configured with direct communication operations, such as sidelink communication operations in V2X and V2V communication systems. For example, the block diagram 400 may include a PSCCH 405 and a PSSCH 410, which may correspond to time resources (for example, a symbol, a minislot, a slot, a subframe, a frame), as well as frequency resources (for example, subcarriers, carriers). In the example illustrated in FIG. 4, the PSCCH 405 may span a single subchannel 415, while the PSSCH 410 may span multiple subchannels 415. A subchannel 415 may occupy a number of PRBs.

Similarly, in the example illustrated in FIG. 4, a PSFCH 420 may correspond to time resources (for example, a symbol, a minislot, a slot, a subframe, a frame), as well as frequency resources (for example, subcarriers, carriers). In some examples, the PSFCH 420 may span one, two, or four symbols. For example, the PSFCH 420 may span two symbols. A slot with a PSFCH may have fewer symbols (e.g., three fewer symbols) for PSSCH than a slot without the PSFCH. In other words, a PSSCH may occupy less symbols of a slot when a PSFCH occupies at least one symbol of the slot. In some examples, a gap symbol 425 may, in some examples, separate the PSSCH 410 and the PSFCH 420.

Returning to FIG. 2, in some examples, a vehicle (e.g., the UE 115-*a*) in a V2X communication system may communicate channel state information (CSI) reports over the D2D communication link 205. In some examples, the vehicle (e.g., the UE 115-*a*) in the V2X communication system may trigger a CSI report in an SCI message. Another vehicle (e.g., the UE 115-*b*) in the V2X communication system may transmit CSI reference signals (CSI-RS) exclusively when the transmitter vehicle (e.g., the UE 115-*a*) triggers the CSI report via the SCI message. In some examples, the other vehicle (e.g., the UE 115-*b*) may transmit the CSI-RS in a unicast sidelink transmission over the D2D communication link 205. Time and frequency resources associated with the CSI-RS may correspond to a PSSCH bandwidth.

As demand for communication efficiency increases, some wireless communications systems, may fail to provide satisfactory direct communications, and as a result, may be unable to support high reliability or low latency direct communications, among other examples. Various aspects of the described techniques relate to configuring one or more of the UE 115-*a* and the UE 115-*b* to support high reliability or low latency direct communications in the wireless communications system 200. The described techniques may be used to configure one or more of the UE 115-*a* and the UE 115-*b* to determine a TBS 215 of a transport block 210 (e.g., transport block 210-*a*, transport block 210-*b*) for direct communications, such as sidelink communications. In some examples, the TBS may include a number of bits for transmitting data over the D2D communication link 205. For example, a vehicle (e.g., the UE 115-*a*) in a V2X communication system may determine a TBS 215 to transmit (or receive) an SCI message over a PSCCH via the D2D communication link 205 to other vehicles (e.g., the UE 115-*b*). A TBS 215 may be the same for an initial transmission and a re-transmission of a same transport block.

In some examples, various aspects of the described techniques relate to configuring one or more of the UE 115-*a* and the UE 115-*b* to determine a TBS 215 for sidelink communications when a DMRS pattern is dynamically-indicated. In some other examples, various aspects of the described techniques relate to configuring one or more of the UE 115-*a* and the UE 115-*b* to determine a TBS 215 for sidelink communications depending on a presence or an absence of a PSFCH. In other examples, various aspects of the described techniques relate to configuring one or more of the UE 115-*a* and the UE 115-*b* to determine a TBS 215 for sidelink communications depending on a second stage control (SCI-2) (e.g., based on a modulation and coding scheme (MCS) and a scaling factor). In some other examples, various aspects of the described techniques relate to configuring one or more of the UE 115-*a* and the UE 115-*b* to determine a TBS for sidelink communications depending on CSI-RS.

In some cases, to determine a TBS, the UE 115-*a* may determine an estimate number of REs $N_{RE}'$ within a PRB. For example, the UE 115-*a* may determine an estimate number of REs $N_{RE}'$ within a PRB according to Equation (1).

$$N_{RE}' = N_{SC}^{PRB} \cdot N_{symb}^{sh} - N_{DMRS}^{PRB} - N_{oh}^{PRB} \tag{1}$$

$N_{SC}^{RB}$ is a number of subcarriers within the PRB, $N_{symb}^{sh}$ is a number of allocated symbols for a physical channel (e.g., a physical shared data channel (PSDCH)), $N_{DMRS}^{PRB}$ is a number of REs for DMRS per PRB, and $N_{oh}^{PRB}$ an overhead associated with the PRB. In some examples, the $N_{oh}^{PRB}$ may configurable to zero REs, 6 REs, 12 REs, or 18 REs. In some cases, to determine a TBS, the UE 115-a may determine a number of REs $N_{RE}$ within a slot according to Equation (2).

$$N_{RE} = \min(156, N_{RE}') \cdot n_{PRB} \quad (2)$$

The UE 115-a may determine a number of allocated PRBs ($n_{PRB}$) (e.g., a total number of PRBs allocated to the UE for sidelink communications where the PRBs are allocated by a another device in the wireless communications system) for the UE 115-a, and the UE 115-a may use the determined value for $N_{RE}'$ from Equation (1) to determine the number of REs $N_{RE}$ within a slot. As a result, the UE 115-a may use the determined number of REs $N_{RE}$ to determine the TBS.

In some examples, the UE 115-a may identify SCI for sidelink communications, as described herein. For example, the UE 115-a may identify SCI for sidelink communications with the UE 115-b. Prior to transmitting (or receiving) the SCI on a physical sidelink channel, the UE 115-a may determine a TBS for the SCI. The UE 115-a may determine an estimate number of REs ($N_{RE}'$) associated with a PRB for the sidelink communications. In some examples, the UE 115-a may determine an estimate number of REs ($N_{RE}'$) associated with the PRB for the sidelink communications, for example, according to Equation (1). The UE 115-a may also determine a number of allocated PRBs ($n_{PRB}$) for the sidelink communications, and determine a number of REs ($N_{RE}$) associated with the PRB (e.g., a number of REs within the slot) for the sidelink communications based on the number of allocated PRBs ($n_{PRB}$), for example, according to Equation (2).

According to various aspects of the described techniques, the UE 115-a may determine a number of REs for a first SCI (e.g., first stage SCI-1 overhead), and subtract the number of REs for the first SCI from the estimate number of REs ($N_{RE}'$) associated with the PRB or the number of REs ($N_{RE}$) associated with the PRB, or both. In some examples, the UE 115-a may determine control overhead associated with the first SCI, and refrain from using the control overhead in the estimate number of REs ($N_{RE}'$) associated with the PRB or the number of REs ($N_{RE}$) associated with the PRB, or both. As such, first stage control overhead may not be considered for TBS calculation.

In some examples, the UE 115-a may determine that a first physical sidelink channel (e.g., a PSCCH) and a second physical sidelink channel (e.g., a PSSCH) are frequency division multiplexed. The UE 115-a may determine that PSSCH occupies the number of REs associated with the PRB, and adjust an overhead of the PSCCH based on a value of the REs occupied by the PSSCH. In other words, a PSCCH overhead per PRB may be scaled by a fraction of REs in a symbol occupied by the PSCCH. The PSCCH overhead may be considered per slot.

In some other examples, the UE 115-a may determine that a first physical sidelink channel (e.g., a PSCCH) and a second physical sidelink channel (e.g., a PSSCH) are time division multiplexed. The UE 115-a may determine an overhead of the PSCCH per PRB based on that the first sidelink channel and the second physical sidelink channel being time division multiplexed. Thus, the PSCCH overhead may be considered per PRB. Alternatively, the PSCCH overhead may be considered per slot. The UE 115-a may determine a number of symbols associated with the PSCCH ($N_{PSCCH}^{symb}$) or the PSSCH, or both, and determine a number of symbols exclusively including the PSCCH. The UE 115-a may exclude the number of symbols exclusively including the PSCCH from the estimate number of REs ($N_{RE}'$) associated with the PRB or the number of REs ($N_{RE}$) associated with the PRB, or both. In other words, the number of PSSCH symbols excludes those containing PSCCH only. For example, the UE 115-a may determine an estimate number of REs ($N_{RE}'$) associated with the PRB according to Equation (3).

$$N_{RE}' = N_{SC}^{RB} \cdot (N_{symb}^{sh} - N_{PSCCH}^{symb}) - N_{DMRS}^{PRB} - N_{oh}^{PRB} \quad (3)$$

According to various aspects of the described techniques, the UE 115-a may determine a number of REs for a second SCI (e.g., second stage SCI-2 overhead), and subtract the number of REs for the second SCI from the estimate number of REs ($N_{RE}'$) associated with the PRB or the number of REs ($N_{RE}$) associated with the PRB, or both. The UE 115-a may determine a control overhead associated with the second SCI based on a target code rate associated with an MCS. Thus, SCI-2 overhead may be calculated using the target code rate from the MCS (instead of actual TBS). The UE 115-a may ignore the control overhead associated with the second SCI. In other words, the overhead associated with the second SCI (e.g., SCI-2 overhead) is not considered for TBS calculations. In some examples, the UE 115-a may identify an MCS for the second SCI, and identify a target code rate based on the MCS for the second SCI. The UE 115-a may determine a number of REs for the second stage control (e.g., SCI-2) using the target code rate from the MCS (instead of actual TBS).

In some examples, according to various aspects of the described techniques, the UE 115-a may receive signaling including an indication of an overhead value (Z), which the UE 115-a may use to determine TBS for sidelink communications. In some examples, the overhead value (Z) may be an overall overhead value, and the UE 115-a may determine an estimate number of REs ($N_{RE}'$) associated with the PRB according to Equation (4).

$$N_{RE}' = N_{SC}^{RB} \cdot N_{symb}^{sh} - Z \quad (4)$$

Alternatively, the overhead value (Z) may be an offset overhead value relative to a DMRS pattern. In some examples, the overhead value (Z) may be an overall overhead value, and the UE 115-a may determine an estimate number of REs ($N_{RE}'$) associated with the PRB according to Equation (5).

$$N_{RE}' = N_{SC}^{RB} \cdot N_{symb}^{sh} - N_{DMRS}^{PRB} - N_{oh}^{PRS} - Z \quad (5)$$

According to various aspects of the described techniques, the UE 115-a may receive signaling including an indication of a number of symbols (Y) to use for the TBS determination. In some examples, the number of symbols (Y) may be an offset to the number of symbols relative to the number of symbols available for PSSCH. The UE 115-a may, for example, determine an estimate number of REs ($N_{RE}'$) associated with the PRB according to Equation (6).

$$N_{RE}' = N_{SC}^{RB} \cdot (N_{symb}^{sh} - Y) - N_{DMRS}^{PRB} - N_{oh}^{PRB} \quad (6)$$

Alternatively, the number of symbols (Y) may be a total number of symbols to use for TBS determination. The UE 115-a may thus determine an estimate number of REs ($N_{RE}'$) associated with the PRB according to Equation (7).

$$N_{RE}' = N_{SC}^{RB} \cdot Y - N_{DMRS}^{PRB} - N_{oh}^{PRB} \quad (7)$$

In some examples, one or more of the overhead value (Z) and the number of symbols (Y) may be signaled using a single field in a message (e.g., jointly encoded or index into a set of values).

According to various aspects of the described techniques, the UE 115-a may determine an overhead of a PSFCH based on a period of the PSFCH. The UE 115-a may scale the overhead of the PSFCH based on the period of the PSFCH. As such, an overhead of the PSFCH may be scaled by a value dependent on the PSFCH period. Alternatively, the UE 115-a may determine an average of the overhead of the PSFCH over the period of the PSFCH. Thus, an overhead of the PSFCH may be taken as an average over a PSFCH period. The UE 115-a may apply the overhead of the PSFCH as a value per PRB. Alternatively, the UE 115-a may apply the overhead of the PSFCH as a change in a number of available PSSCH symbols.

In some examples, according to various aspects of the described techniques, the UE 115-a may adjust the number of REs ($N_{RE}$) associated with the PRB for the sidelink communications to a number of REs associated with the PRB for non-sidelink communications (Uu). For example, the UE 115-a may round the number of REs ($N_{RE}$) associated with the PRB for the sidelink communications to a nearest number of REs associated with the PRB for non-sidelink communications (Uu). Alternatively, the UE 115-a may round the number of REs ($N_{RE}$) associated with the PRB for the sidelink communications to a floor value or a ceiling value associated with a number of REs associated with the PRB for non-sidelink communications (Uu).

In some examples, according to various aspects of the described techniques, the UE 115-a may also determine a CSI-RS overhead and refrain from using the CSI-RS overhead from determining the estimate number of REs ($N_{RE}'$) associated with the PRB or determining the number of REs ($N_{RE}$) associated with the PRB, or both. In other words, CSI-RS overhead is not accounted for in TBS determination for sidelink communications. Upon determining a TBS for the SCI based on one or more of the above various aspects, the UE 115-a may transmit (or receive) the SCI on the physical sidelink channel (e.g., PSCCH, PSSCH) to the UE 115-b.

The operations performed by the UEs 115, for example, may provide improvements to direction communication operations related to sidelink communication in the wireless communications system 200. Further, the operations performed by the UEs 115 may provide benefits and enhancements to the operation of the UEs 115. For example, by supporting TBS determination operations for sidelink communications, the UEs 115 may preserve power, while simultaneously supporting higher reliability and lower latency sidelink communications, resulting in enhanced power efficiency and network throughput in the wireless communications system 200.

Figure 5:
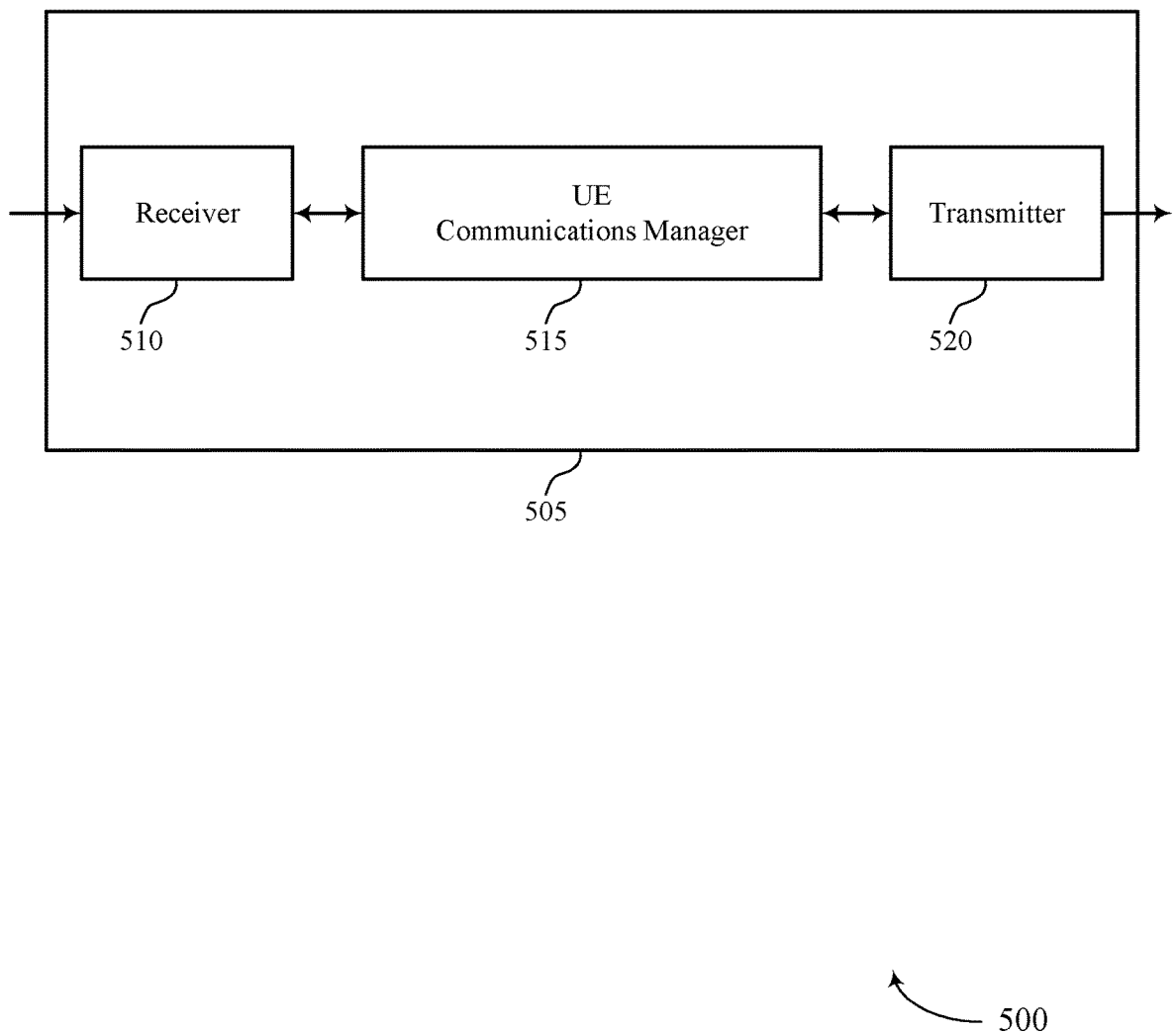

FIG. 5 shows a block diagram 500 of a device 505 that supports sidelink communications in accordance with one or more aspects of the present disclosure. The device 505 may be an example of aspects of a device as described herein. The device 505 may include a receiver 510, a UE communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to TBS determination for sidelink communications, etc.). Information may be passed on to other components of the device 505. The receiver 510 may be an example of aspects of the transceiver 820 described with reference to FIG. 8. The receiver 510 may utilize a single antenna or a set of antennas.

The UE communications manager 515 may identify sidelink information for sidelink communications, determine a TBS for the sidelink information based on an overhead of a second physical sidelink channel for communicating the sidelink information, encode the sidelink information for the sidelink communications based on the TBS, and transmit the encoded sidelink information on a physical sidelink channel. The UE communications manager 515 may also identify sidelink information for sidelink communications, determine a TB S for the sidelink information based on an overhead of a second physical sidelink channel for communicating the sidelink information, decode the sidelink information for the sidelink communications based on the TBS, and receive the decoded sidelink information on a physical sidelink channel. The UE communications manager 515 may be an example of aspects of the UE communications manager 810 described herein.

The UE communications manager 515 may as described herein be implemented to realize one or more potential advantages. One implementation may allow the device 505 to save power and increase battery life by communicating with a base station 105 (as shown in FIG. 1) more efficiently. For example, the device 505 may reduce a number of retransmissions associated with sidelink communications when resources for TBS determination change in a wireless communications system, such as a V2X system. In addition, the device 505 may experience reduced complexity, better throughput through efficient TBS determination for sidelink communications. Another implementation may promote higher reliability and lower latency communications at the device 505 due to TBS determination flexibility of the device 505, as a result of supporting TBS determination for sidelink communications.

The UE communications manager 515, or its sub-components, may be implemented in hardware, code (e.g., software or firmware) executed by a processor, or any combination thereof. If implemented in code executed by a processor, the functions of the UE communications manager 515, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 515, or its sub-components, may be physically located at various positions, including being distributed such that portions of functions are implemented at different physical locations by one or more physical components. In some examples, the UE communications manager 515, or its sub-components, may be a separate and distinct component in accordance with various aspects of the present disclosure. In some examples, the UE communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The UE communications manager 515 may be an example of means for performing various aspects of TBS determination for sidelink communications as described herein. The UE communications manager 515, or its sub-components, may be implemented in hardware (e.g., in communications management circuitry). The circuitry may comprise of processor, digital signal processor (DSP), an application-specific integrated circuit (ASIC), an FPGA or other programmable logic device, discrete gate or transistor logic, discrete hardware components, or any combination thereof designed to perform the functions described in the present disclosure.

In another implementation, the UE communications manager 515, or its sub-components, may be implemented in code (e.g., as communications management software or firmware) executed by a processor, or any combination thereof. If implemented in code executed by a processor, the functions of the UE communications manager 515, or its sub-components may be executed by a general-purpose processor, a DSP, an ASIC, an FPGA or other programmable logic device.

In some examples, the UE communications manager 515 may be configured to perform various operations (e.g., receiving, determining, transmitting, subtracting, ignoring, identifying, scaling, excluding, adjusting, refraining from, applying, allocating) using or otherwise in cooperation with the receiver 510, the transmitter 520, or both.

The transmitter 520 may transmit signals generated by other components of the device 505. In some examples, the transmitter 520 may be collocated with a receiver 510 in a transceiver component. For example, the transmitter 520 may be an example of aspects of the transceiver 820 described with reference to FIG. 8. The transmitter 520 may utilize a single antenna or a set of antennas.

Figure 6:
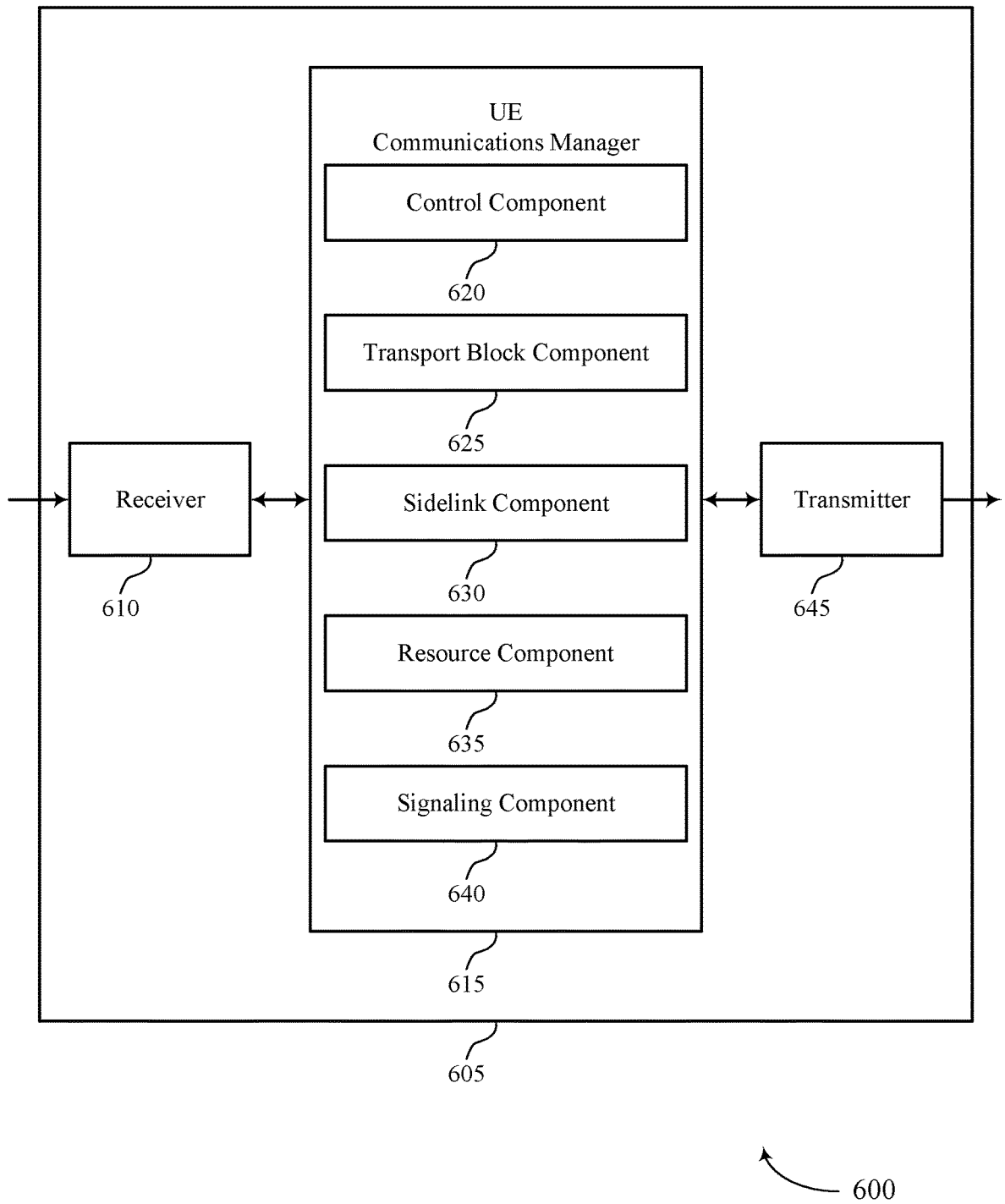

FIG. 6 shows a block diagram 600 of a device 605 that supports sidelink communications in accordance with one or more aspects of the present disclosure. The device 605 may be an example of aspects of a device 505 or a UE 115 as described herein. The device 605 may include a receiver 610, a UE communications manager 615, and a transmitter 645. The device 605 may also include a processor. Each of these components may be in communication with one another (e.g., via one or more buses).

The receiver 610 may receive information such as packets, user data, or control information associated with various information channels (e.g., control channels, data channels, and information related to TBS determination for sidelink communications, etc.). Information may be passed on to other components of the device 605. The receiver 610 may be an example of aspects of the transceiver 820 described with reference to FIG. 8. The receiver 610 may utilize a single antenna or a set of antennas.

The UE communications manager 615 may be an example of aspects of the UE communications manager 515 as described herein. The UE communications manager 615 may include a control component 620, a transport block component 625, a sidelink component 630, a resource component 635, and a signaling component 640. The UE communications manager 615 may be an example of aspects of the UE communications manager 810 described herein.

The control component 620 may identify sidelink information for sidelink communications. The transport block component 625 may determine a TBS for the sidelink information based on an overhead of a second physical sidelink channel for communicating the sidelink information. The control component 620 may encode the sidelink information for the sidelink communications based on the TBS. The sidelink component 630 may transmit the encoded sidelink information on a physical sidelink channel. The resource component 635 may allocate resources for sidelink communications on a physical sidelink channel. The signaling component 640 may transmit, based on the allocating, signaling including an indication of the resources for the sidelink communications. The sidelink component 630 may receive SCI on the physical sidelink channel based on the signaling, where TBS for the SCI is determined based on the indication of the resources for the sidelink communications. The control component 620 may identify sidelink information for sidelink communications. The transport block component 625 may determine a TBS for the sidelink information based on an overhead of a second physical sidelink channel for communicating the sidelink information. The control component 620 may decode the sidelink information for the sidelink communications based on the TBS. The sidelink component 630 may receive the decoded sidelink information on a physical sidelink channel.

The transmitter 645 may transmit signals generated by other components of the device 605. In some examples, the transmitter 645 may be collocated with a receiver 610 in a transceiver component. For example, the transmitter 645 may be an example of aspects of the transceiver 820 described with reference to FIG. 8. The transmitter 645 may utilize a single antenna or a set of antennas.

Figure 7:
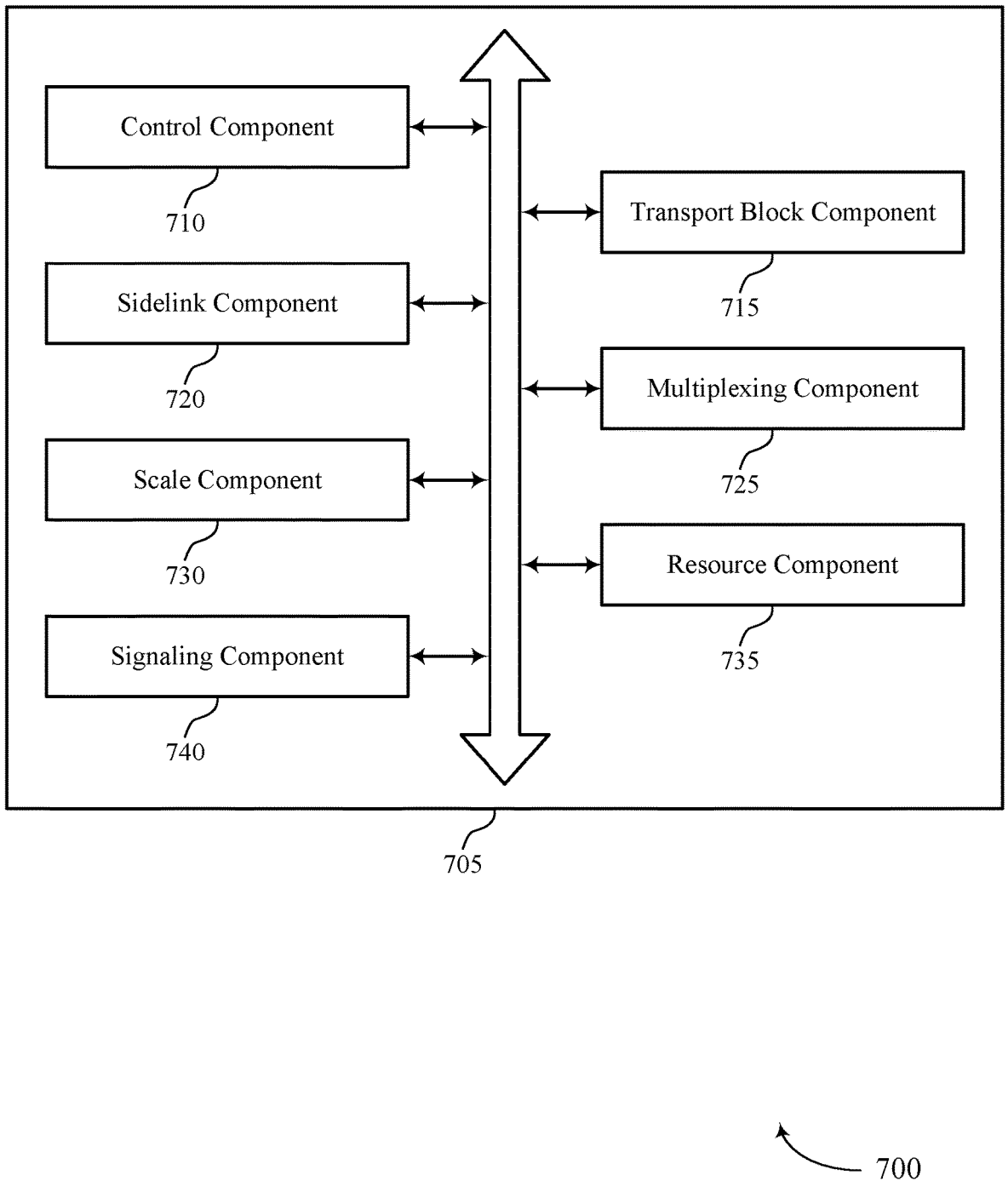
FIG. 7 shows a block diagram of a UE communications manager that supports sidelink communications in accordance with one or more aspects of the present disclosure.

FIG. 7 shows a block diagram 700 of a UE communications manager 705 that supports sidelink communications in accordance with one or more aspects of the present disclosure. The UE communications manager 705 may be an example of aspects of a UE communications manager 515, a UE communications manager 615, or a UE communications manager 810 described herein. The UE communications manager 705 may include a control component 710, a transport block component 715, a sidelink component 720, a multiplexing component 725, a scale component 730, a resource component 735, and a signaling component 740. Each of these components may communicate, directly or indirectly, with one another (e.g., via one or more buses).

The control component 710 may identify sidelink information for sidelink communications. The control component 710 may encode (or decode) the sidelink information for the sidelink communications based on a TBS. In some examples, the control component 710 may determine control overhead associated with a first SCI. In some examples, the control component 710 may refrain from using the control overhead in an estimate number of REs associated with a PRB or a number of REs associated with the allocated PRBs, or both, where determining the TBS may be based on the refraining. In some examples, the control component 710 may determine an overhead of the PSCCH per PRB based on determining that a first physical sidelink channel and a second physical sidelink channel are time division multiplexed, where determining the TBS may be based on the overhead of the PSCCH being per PRB.

In some examples, the control component 710 may determine a control overhead associated with a second SCI based on a target code rate associated with an MCS, where determining the TBS may be based on the control overhead associated with the second SCI. In some examples, the control component 710 may ignore the control overhead associated with the second SCI, where determining the TBS may be based on ignoring the control overhead associated with the second SCI. In some examples, the control component 710 may identify an MCS for the sidelink communications. In some examples, the control component 710 may identify a target code rate based on the MCS for the sidelink communications, where determining the number of REs for the second SCI may be based on the target code rate.

In some examples, the control component 710 may determine a CSI-RS overhead. In some examples, the control component 710 may refrain from using the CSI-RS overhead for determining the estimate number of REs associated with the PRB or determining the number of REs associated with the allocated PRBs, or both, where determining the TBS may be based on the ignoring. In some examples, the control component 710 may determine a number of subcarriers associated with the PRB, where determining the estimate number of REs associated with the PRB may be based on the number of subcarriers associated with the PRB. In some examples, the control component 710 may determine a number of allocated symbols associated with a physical sidelink channel, where determining the estimate number of REs associated with the PRB may be based on one or more of the number of subcarriers associated with the PRB and the number of allocated symbols associated with the physical sidelink channel.

In some examples, the control component 710 may determine a DMRS overhead associated with the PRB, where determining the estimate number of REs associated with the PRB may be based on the DMRS signal overhead associated with the PRB. In some examples, the control component 710 may determine control overhead associated with the PRB, where determining the estimate number of REs associated with the PRB may be based on the control overhead associated with the PRB. In some examples, the control component 710 may determine an overhead of the physical sidelink channel based on a period of the physical sidelink channel, where determining the TBS is based on the overhead of the physical sidelink channel.

In some examples, the control component 710 may scale the overhead of the physical sidelink channel based on the period of the physical sidelink channel, where determining the TBS is based on the scaling. In some examples, the control component 710 may determine an average of the overhead of the physical sidelink channel over the period of the physical sidelink channel, where determining the TBS is based on the average of the overhead of the physical sidelink channel over the period of the physical sidelink channel. In some examples, the control component 710 may apply the overhead of the physical sidelink channel as a value per PRB, where determining the TBS is based on the applying. In some cases, the physical sidelink channel includes a PSFCH. In some cases, the overhead of the physical sidelink channel corresponds to a number of available symbols of a second physical sidelink channel, the second physical sidelink channel including a PSSCH.

The transport block component 715 may determine the TB S for the sidelink information based on an overhead of a second physical sidelink channel for communicating the sidelink information. In some examples, the transport block component 715 may determine an estimate number of REs associated with a PRB for the sidelink communications, where determining the TBS is based on the estimate number of REs associated with the PRB. In some examples, the transport block component 715 may determine a number of allocated PRBs for the sidelink communications. In some examples, the transport block component 715 may determine a number of REs associated with the allocated PRBs for the sidelink communications based on the number of allocated PRBs or the estimate number of REs associated with the PRB, or both, where determining the TBS is based on the number of REs associated with the allocated PRBs for the sidelink communications.

In some examples, the transport block component 715 may determine a number of REs for a first SCI. In some examples, the transport block component 715 may subtract the number of REs for the first SCI from the number of REs associated with the PRB, where determining the TBS may be based on the subtracting. In some examples, the transport block component 715 may determine the TBS based on the overhead of the PSCCH per slot. In some examples, the transport block component 715 may determine the TBS is based on an overhead of the PSCCH per slot. In some examples, the transport block component 715 may adjust the number of REs associated with the allocated PRBs for the sidelink communications to a number of REs associated with the allocated PRBs for non-sidelink communications.

The sidelink component 720 may transmit (or receive) the encoded (or decoded) sidelink information on the physical sidelink channel. In some examples, the sidelink component 720 may receive sidelink information on the physical sidelink channel based on the signaling, where the TBS for the sidelink information is determined based on the indication of the resources for the sidelink communications. In some examples, the sidelink component 720 may transmit (or receive) the first SCI on a PSCCH based on the TBS. In some examples, the sidelink component 720 may transmit (or receive) the second SCI on a PSSCH based on the TBS. In some cases, the physical sidelink channel includes a PSSCH. In some cases, the physical sidelink channel includes a PSCCH.

The resource component 735 may allocate resources for sidelink communications on a physical sidelink channel. In some examples, the resource component 735 may determine a number of symbols associated with the PSCCH or the PSSCH, or both. In some examples, the resource component 735 may determine a number of symbols exclusively including the PSCCH. In some examples, the resource component 735 may exclude the number of symbols exclusively including the PSCCH from the estimate number of REs associated with the PRB or the number of REs associated with the allocated PRBs, or both, where determining the TBS is based on the excluding.

In some examples, the resource component 735 may determine a number of REs for a second SCI. In some examples, the resource component 735 may subtract the number of REs for the second SCI from the estimate number of REs associated with the PRB or the number of REs associated with the allocated PRBs, or both, where determining the TBS is based on the subtracting.

The signaling component 740 may transmit, based on the allocating, signaling including an indication of the resources for the sidelink communications. In some examples, the signaling component 740 may receive signaling including an indication of an overhead value, where determining the estimate number of REs associated with the PRB is based on the signaled overhead value. In some examples, the signaling component 740 may receive signaling including an indication of an offset overhead value relative to a demodulation reference signal pattern, where determining the estimate number of REs associated with the PRB is based on the signaled offset overhead value. In some examples, the signaling component 740 may receive signaling including an indication of a number of symbols to use for the TBS determination, where determining the TBS is based on the signaling.

In some examples, the signaling component 740 may determine a number of allocated symbols associated with the physical sidelink channel, the physical sidelink channel including a PSCCH. In some examples, the signaling component 740 may subtract the number of symbols to use for the TBS determination from the number of allocated symbols associated with the physical sidelink channel, where determining the estimate number of REs associated with the PRB is based on the subtracting. In some examples, the signaling component 740 may determine the estimate number of REs associated with the PRB is based on the number of symbols to use for the TBS determination.

In some examples, the signaling component 740 may transmit signaling including an indication of an overhead value, where an estimate number of REs associated with a PRB for the sidelink communications is based on the signaled overhead value. In some examples, the signaling component 740 may transmit signaling including an indication of a number of symbols to use for the TBS determination, where the TBS is based on the number of symbols to use for the TBS determination.

The multiplexing component 725 may determine that a first physical sidelink channel and a second physical sidelink channel are frequency division multiplexed, the first physical sidelink channel includes a PSSCH and the second physical sidelink channel includes a PSCCH, where determining the TBS is based on that the first physical sidelink channel and the second physical sidelink channel are frequency division multiplexed. In some examples, determining that a first physical sidelink channel and a second physical sidelink channel are time division multiplexed, the first physical sidelink channel includes a PSSCH and the second physical sidelink channel includes a PSCCH, where determining the TBS is based on determining that the first physical sidelink channel and the second physical sidelink channel are time division multiplexed. The scale component 730 may determine that the PSSCH occupies the number of REs associated with the allocated PRBs. In some examples, the scale component 730 may adjust an overhead of the PSCCH based at least in part on a value of the number of REs occupied by the PSSCH, where the overhead of the PSCCH is per slot.

Figure 8:
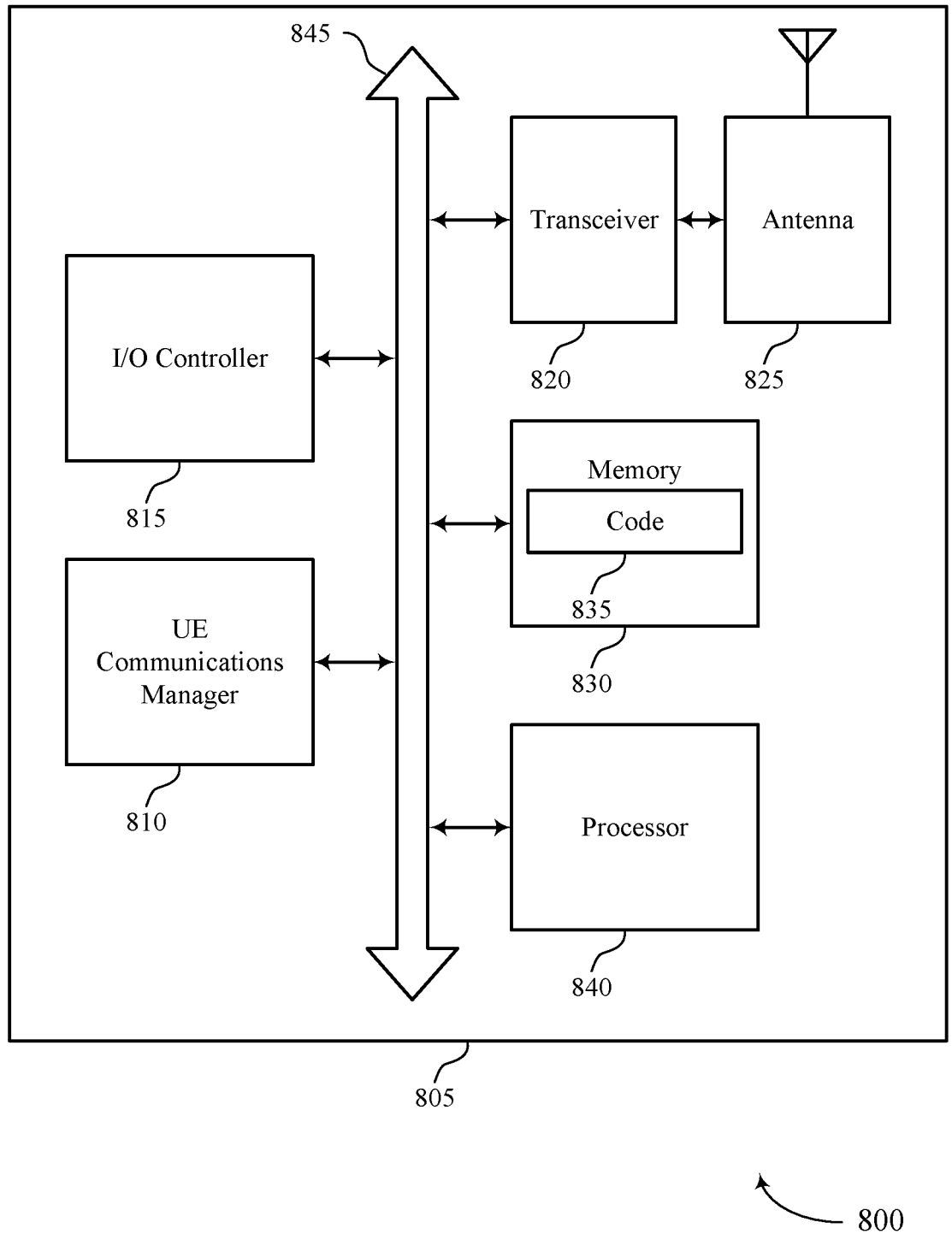
FIG. 8 shows a diagram of a system including a device that supports sidelink communications in accordance with one or more aspects of the present disclosure.

FIG. 8 shows a diagram of a system 800 including a device 805 that supports sidelink communications in accordance with one or more aspects of the present disclosure. The device 805 may be an example of or include the components of device 505, device 605, or a device as described herein. The device 805 may include components for bi-directional voice and data communications including components for transmitting and receiving communications, including a UE communications manager 810, an I/O controller 815, a transceiver 820, an antenna 825, memory 830, and a processor 840. These components may be in electronic communication via one or more buses (e.g., bus 845).

The UE communications manager 810 may identify sidelink information for sidelink communications, determine a TBS for the sidelink information based on an overhead of a second physical sidelink channel for communicating the sidelink information, encode the sidelink information for the sidelink communications based on the TBS, and transmit the encoded sidelink information on the physical sidelink channel. The UE communications manager 810 may identify sidelink information for sidelink communications, determine a TBS for the sidelink information based on an overhead of a second physical sidelink channel for communicating the sidelink information, decode the sidelink information for the sidelink communications based on the TBS, and receive the decoded sidelink information on the physical sidelink channel.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas. In some examples, the device 805 may include a single antenna 825. However, in some examples, the device 805 may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting TBS determination for sidelink communications).

Figure 9:
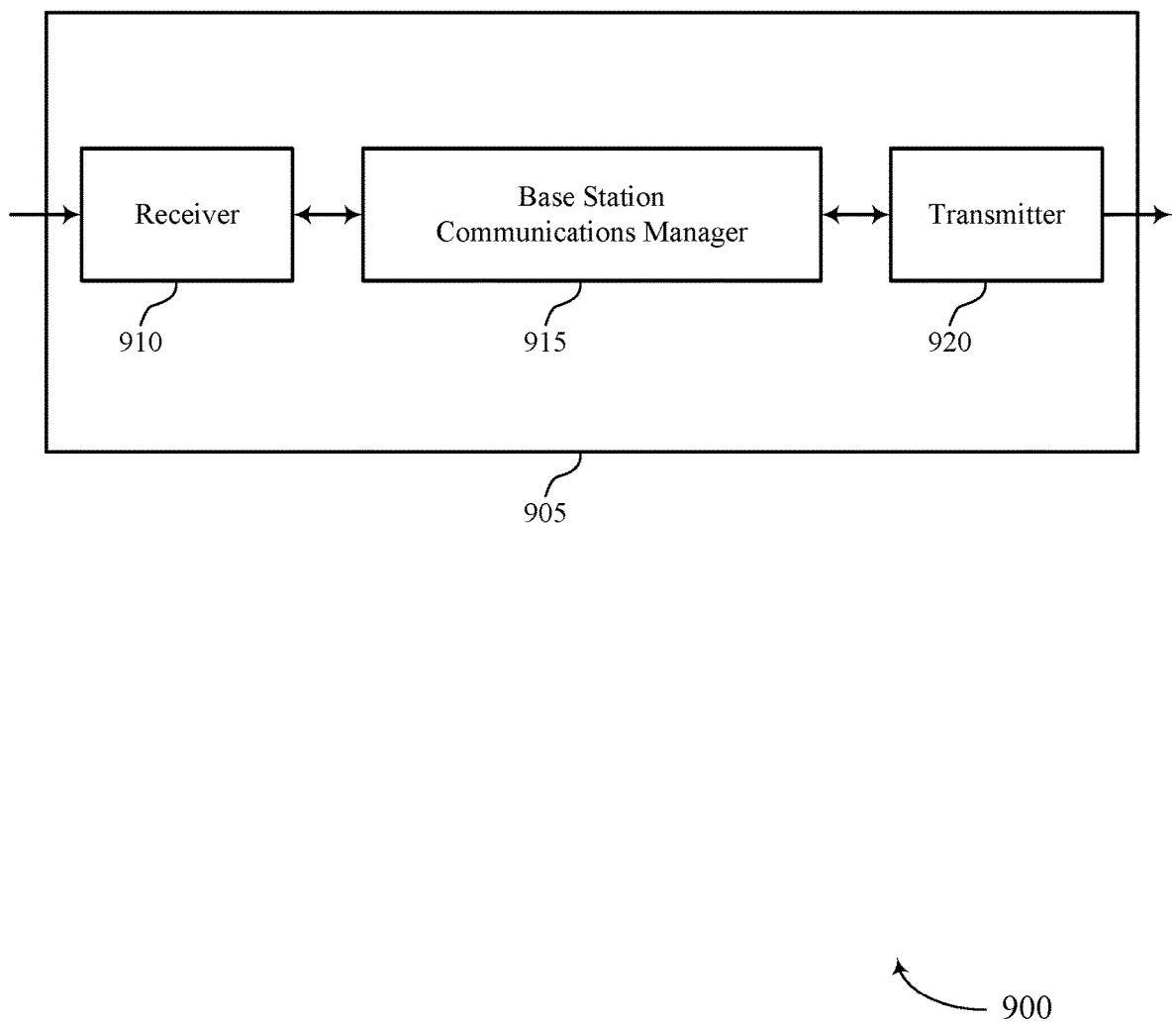
FIGS. 9 and 10 show block diagrams of devices that support sidelink communications in accordance with one or more aspects of the present disclosure.

FIG. 9 shows a block diagram 900 of a device 905 that supports sidelink communications in accordance with one or more aspects of the present disclosure. The device 905 may be an example of aspects of a base station 105 as described herein. The device 905 may include a receiver 910, a base station communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to TBS determination for sidelink communications, etc.). Information may be passed on to other components of the device 905. The receiver 910 may be an example of aspects of the transceiver 1220 described with reference to FIG. 12. The receiver 910 may utilize a single antenna or a set of antennas.

The base station communications manager 915 may allocate resources for sidelink communications on a physical sidelink channel, transmit, based on the allocating, signaling including an indication of the resources for the sidelink communications, and receive SCI on the physical sidelink channel based on the signaling, where TBS for the SCI is determined based on the indication of the resources for the sidelink communications. The base station communications manager 915 may be an example of aspects of the base station communications manager 1210 described herein.

The base station communications manager 915, or its sub-components, may be implemented in hardware, code (e.g., software or firmware) executed by a processor, or any combination thereof. If implemented in code executed by a processor, the functions of the base station communications manager 915, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The base station communications manager 915, or its sub-components, may be physically located at various positions, including being distributed such that portions of functions are implemented at different physical locations by one or more physical components. In some examples, the base station communications manager 915, or its sub-components, may be a separate and distinct component in accordance with various aspects of the present disclosure. In some examples, the base station communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The base station communications manager 915 may be an example of means for performing various aspects of TBS determination for sidelink communications. The base station communications manager 915, or its sub-components, may be implemented in hardware (e.g., in communications management circuitry). The circuitry may comprise of processor, DSP, an ASIC, an FPGA or other programmable logic device, discrete gate or transistor logic, discrete hardware components, or any combination thereof designed to perform the functions described in the present disclosure.

In another implementation, the base station communications manager 915, or its sub-components, may be implemented in code (e.g., as communications management software or firmware) executed by a processor, or any combination thereof. If implemented in code executed by a processor, the functions of the base station communications manager 915, or its sub-components may be executed by a general-purpose processor, a DSP, an ASIC, an FPGA or other programmable logic device.

In some examples, the base station communications manager 915 may be configured to perform various operations (e.g., receiving, determining, transmitting, allocating, etc.) using or otherwise in cooperation with the receiver 910, the transmitter 920, or both.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
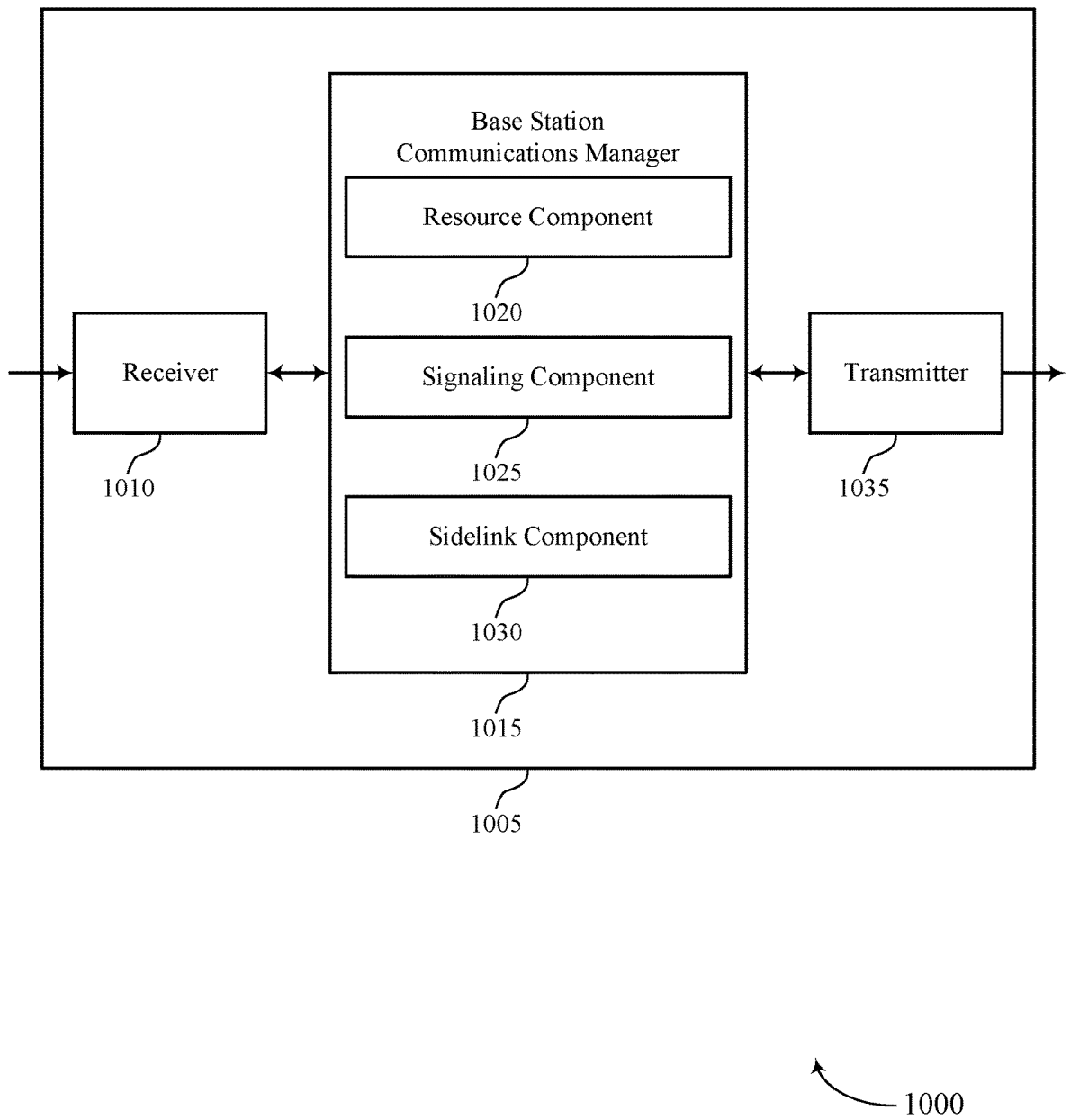

FIG. 10 shows a block diagram 1000 of a device 1005 that supports transport sidelink communications in accordance with one or more aspects of the present disclosure. The device 1005 may be an example of aspects of a device 905, or a base station 105 as described herein. The device 1005 may include a receiver 1010, a base station communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to TBS determination for sidelink communications, etc.). Information may be passed on to other components of the device 1005. The receiver 1010 may be an example of aspects of the transceiver 1220 described with reference to FIG. 12. The receiver 1010 may utilize a single antenna or a set of antennas.

The base station communications manager 1015 may be an example of aspects of the base station communications manager 915 as described herein. The base station communications manager 1015 may include a resource component 1020, a signaling component 1025, and a sidelink component 1030. The base station communications manager 1015 may be an example of aspects of the base station communications manager 915 described herein.

The resource component 1020 may allocate resources for sidelink communications on a physical sidelink channel. The signaling component 1025 may transmit, based on the allocating, signaling including an indication of the resources for the sidelink communications. The sidelink component 1030 may receive SCI on the physical sidelink channel based on the signaling, where TBS for the SCI is determined based on the indication of the resources for the sidelink communications.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
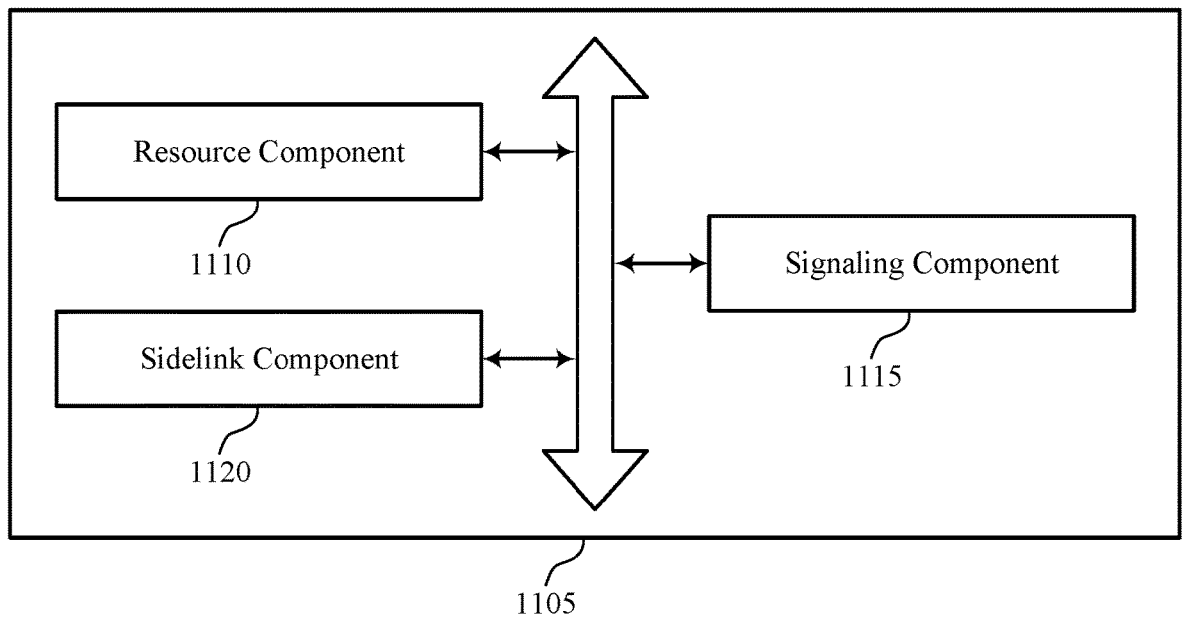
FIG. 11 shows a block diagram of a base station communications manager that supports sidelink communications in accordance with one or more aspects of the present disclosure.

FIG. 11 shows a block diagram 1100 of a base station communications manager 1105 that supports sidelink communications in accordance with one or more aspects of the present disclosure. The base station communications manager 1105 may be an example of aspects of a base station communications manager 915, a base station communications manager 1015, or a base station communications manager 1210 described herein. The base station communications manager 1105 may include a resource component 1110, a signaling component 1115, and a sidelink component 1120. Each of these modules may communicate, directly or indirectly, with one another (e.g., via one or more buses).

The resource component 1110 may allocate resources for sidelink communications on a physical sidelink channel. The signaling component 1115 may transmit, based on the allocating, signaling including an indication of the resources for the sidelink communications. In some examples, the signaling component 1115 may transmit signaling including an indication of an overhead value, where an estimate number of REs associated with a PRB for the sidelink communications is based on the signaled overhead value. In some examples, the signaling component 1115 may transmit signaling including an indication of a number of symbols to use for the TBS determination, where the TBS is based on the number of symbols to use for the TBS determination. The sidelink component 1120 may receive SCI on the physical sidelink channel based on the signaling, where TBS for the SCI is determined based on the indication of the resources for the sidelink communications. In some cases, the physical sidelink channel includes a PSSCH. In some cases, the physical sidelink channel includes a PSCCH.

Figure 12:
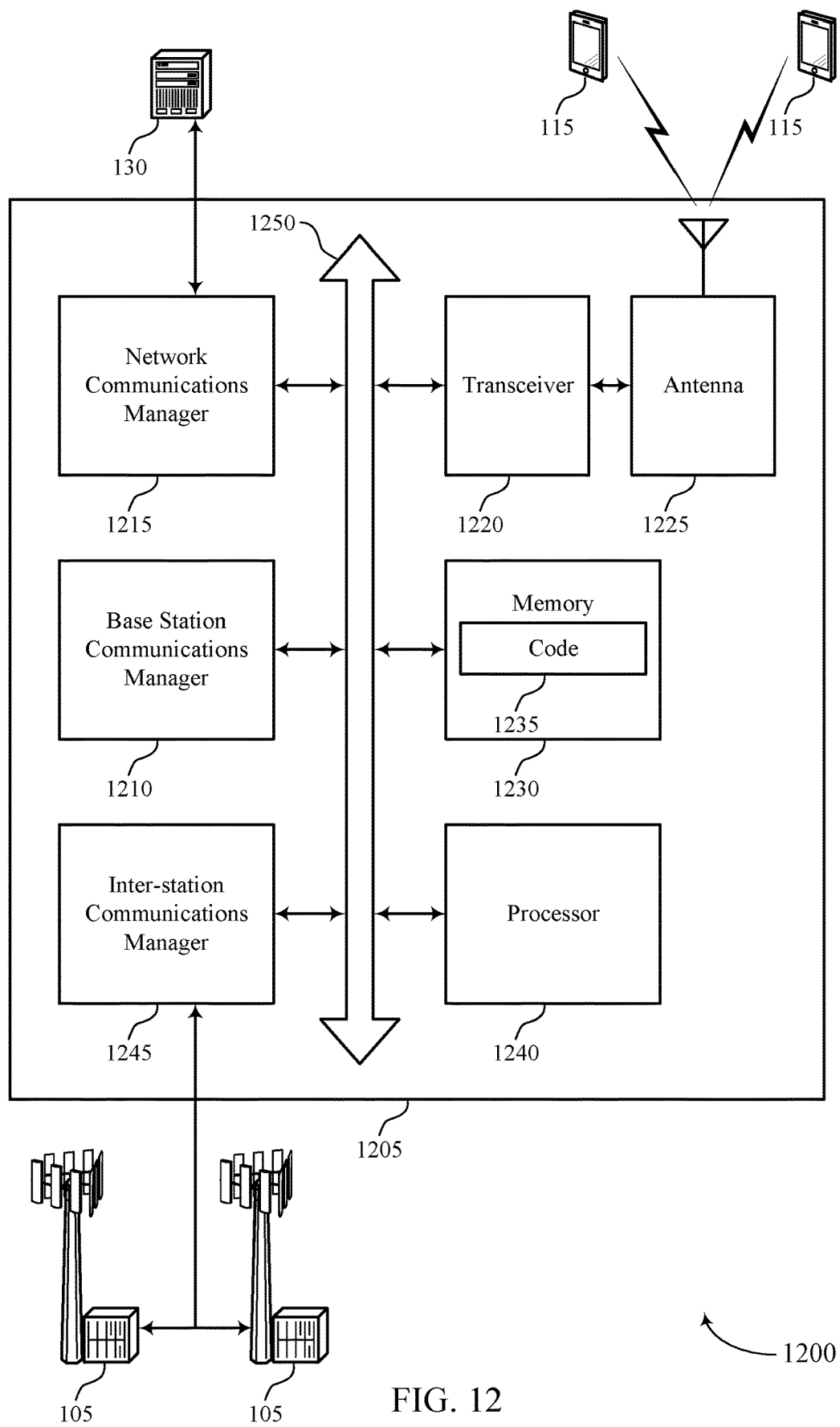
FIG. 12 shows a diagram of a system including a device that supports sidelink communications in accordance with one or more aspects of the present disclosure.

FIG. 12 shows a diagram of a system 1200 including a device 1205 that supports sidelink communications in accordance with one or more aspects of the present disclosure. The device 1205 may be an example of or include the components of device 905, device 1005, or a base station 105 as described herein. The device 1205 may include components for bi-directional voice and data communications including components for transmitting and receiving communications, including a base station communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The base station communications manager 1210 may allocate resources for sidelink communications on a physical sidelink channel, transmit, based on the allocating, signaling including an indication of the resources for the sidelink communications, and receive SCI on the physical sidelink channel based on the signaling, where TBS for the SCI is determined based on the indication of the resources for the sidelink communications.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas. In some cases, the device 1205 may include a single antenna 1225. However, in some cases, the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting TBS determination for sidelink communications).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

Figure 13:
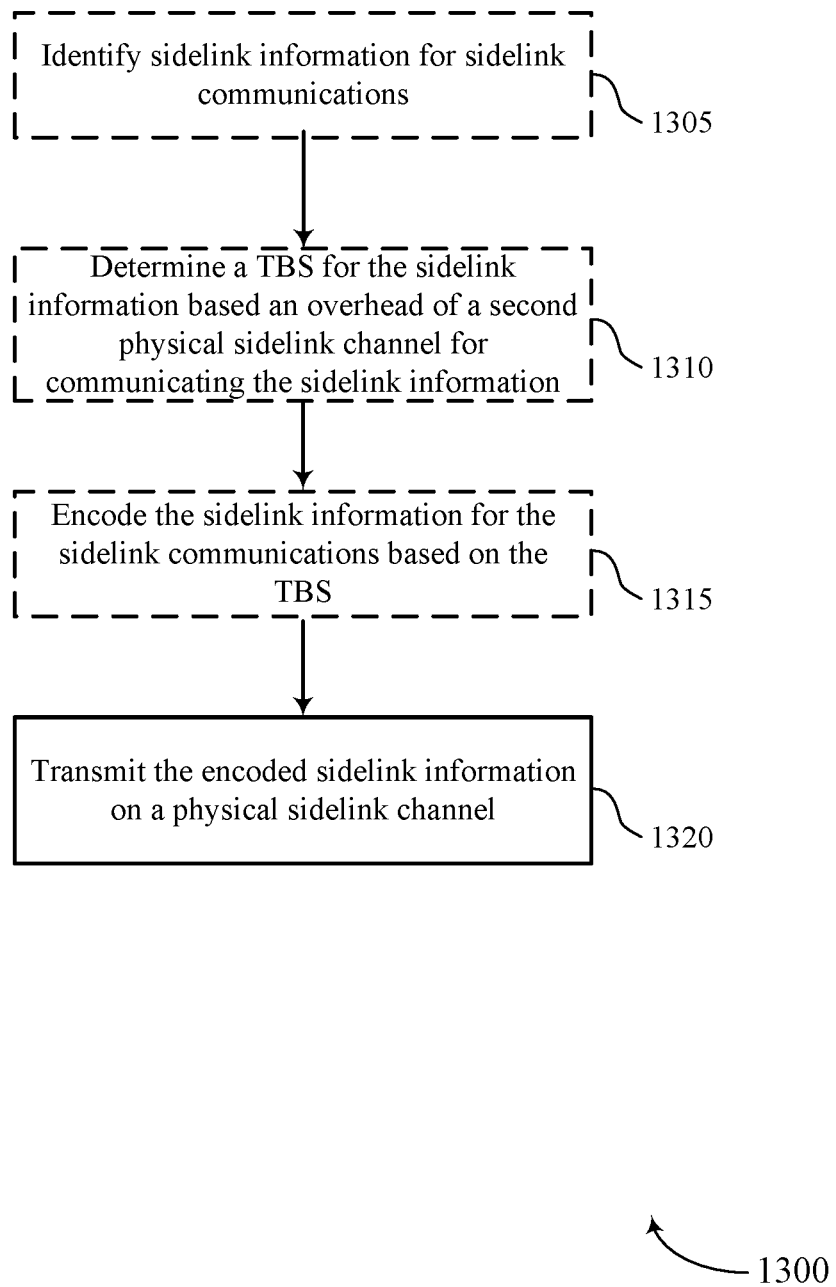
FIGS. 13 through 19 show flowcharts illustrating methods that support sidelink communications in accordance with one or more aspects of the present disclosure.

FIG. 13 shows a flowchart illustrating a method 1300 that supports sidelink communications in accordance with one or more aspects of the present disclosure. The operations of method 1300 may be implemented by a device or its components as described herein. For example, the operations of method 1300 may be performed by a UE communications manager as described with reference to FIGS. 5 through 8. In some examples, a device may execute a set of instructions to control the functional elements of the device to perform the functions described herein. Additionally or alternatively, a device may perform aspects of the functions described herein using special-purpose hardware.

At 1305, the device may identify sidelink information for sidelink communications. The operations of 1305 may be performed according to the methods described herein. In some examples, aspects of the operations of 1305 may be performed by a control component as described with reference to FIGS. 5 through 8.

At 1310, the device may determine a TBS for the sidelink information based on an overhead of a second physical sidelink channel for communicating the sidelink information. The operations of 1310 may be performed according to the methods described herein. In some examples, aspects of the operations of 1310 may be performed by a transport block component as described with reference to FIGS. 5 through 8.

At 1315, the device may encode the sidelink information for the sidelink communications based on the TBS. The operations of 1315 may be performed according to the methods described herein. In some examples, aspects of the operations of 1315 may be performed by a control component as described with reference to FIGS. 5 through 8.

At 1320, the device may transmit the encoded sidelink information on a physical sidelink channel. The operations of 1320 may be performed according to the methods described herein. In some examples, aspects of the operations of 1320 may be performed by a sidelink component as described with reference to FIGS. 5 through 8.

Figure 14:
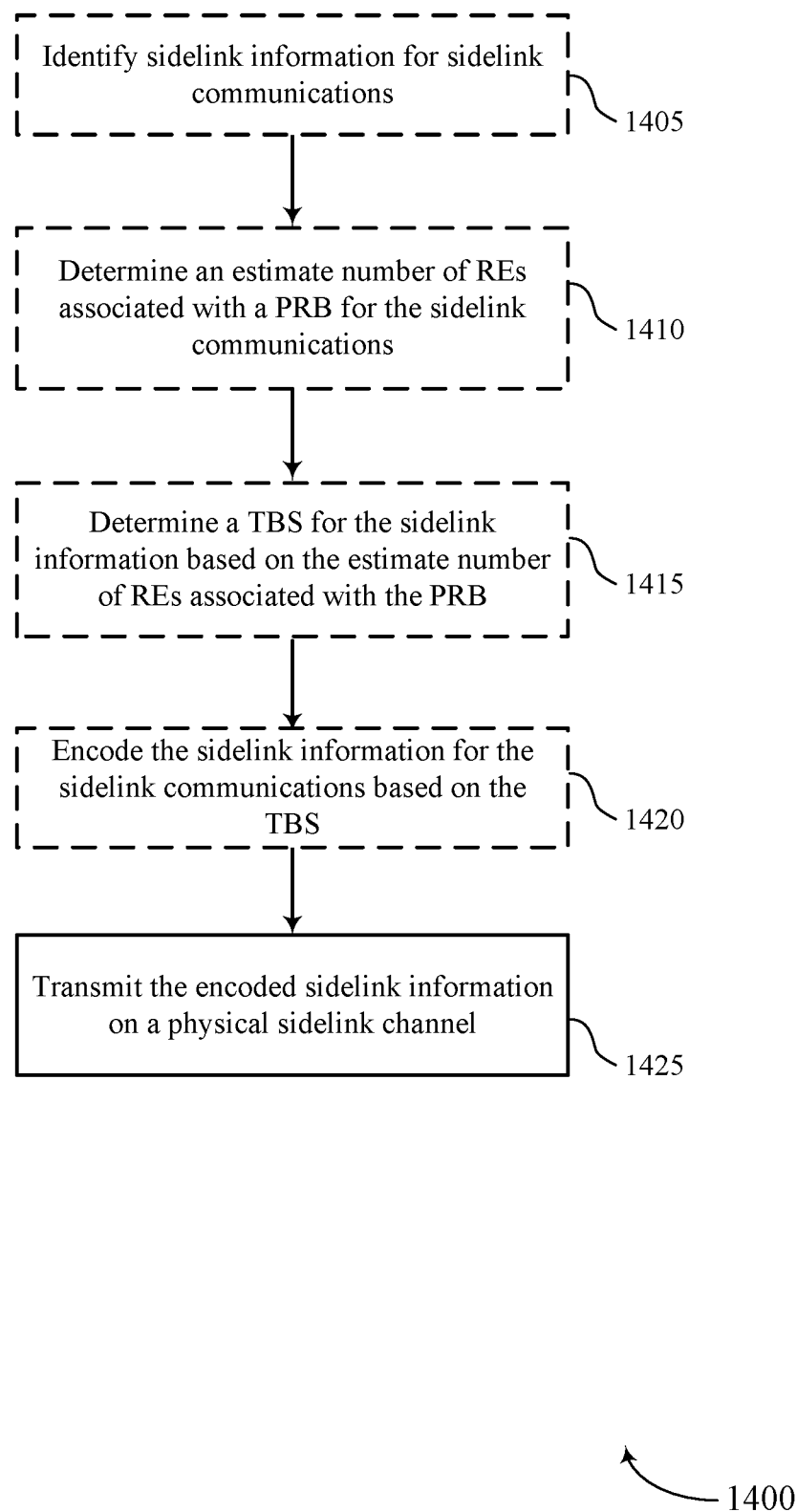

FIG. 14 shows a flowchart illustrating a method 1400 that supports sidelink communications in accordance with one or more aspects of the present disclosure. The operations of method 1400 may be implemented by a device or its components as described herein. For example, the operations of method 1400 may be performed by a UE communications manager as described with reference to FIGS. 5 through 8. In some examples, a device may execute a set of instructions to control the functional elements of the device to perform the functions described herein. Additionally or alternatively, a device may perform aspects of the functions described herein using special-purpose hardware.

At 1405, the device may identify sidelink information for sidelink communications. The operations of 1405 may be performed according to the methods described herein. In some examples, aspects of the operations of 1405 may be performed by a control component as described with reference to FIGS. 5 through 8.

At 1410, the device may determine an estimate number of REs associated with a PRB for the sidelink communications. The operations of 1410 may be performed according to the methods described herein. In some examples, aspects of the operations of 1410 may be performed by a transport block component as described with reference to FIGS. 5 through 8.

At 1415, the device may determine a TBS for the SCI based on the estimate number of REs associated with the PRB. The operations of 1415 may be performed according to the methods described herein. In some examples, aspects of the operations of 1415 may be performed by a transport block component as described with reference to FIGS. 5 through 8.

At 1420, the device may encode the sidelink information for the sidelink communications based on the TBS. The operations of 1420 may be performed according to the methods described herein. In some examples, aspects of the operations of 1420 may be performed by a control component as described with reference to FIGS. 5 through 8.

At 1425, the device may transmit the encoded sidelink information on a physical sidelink channel. The operations of 1425 may be performed according to the methods described herein. In some examples, aspects of the operations of 1425 may be performed by a sidelink component as described with reference to FIGS. 5 through 8.

Figure 15:
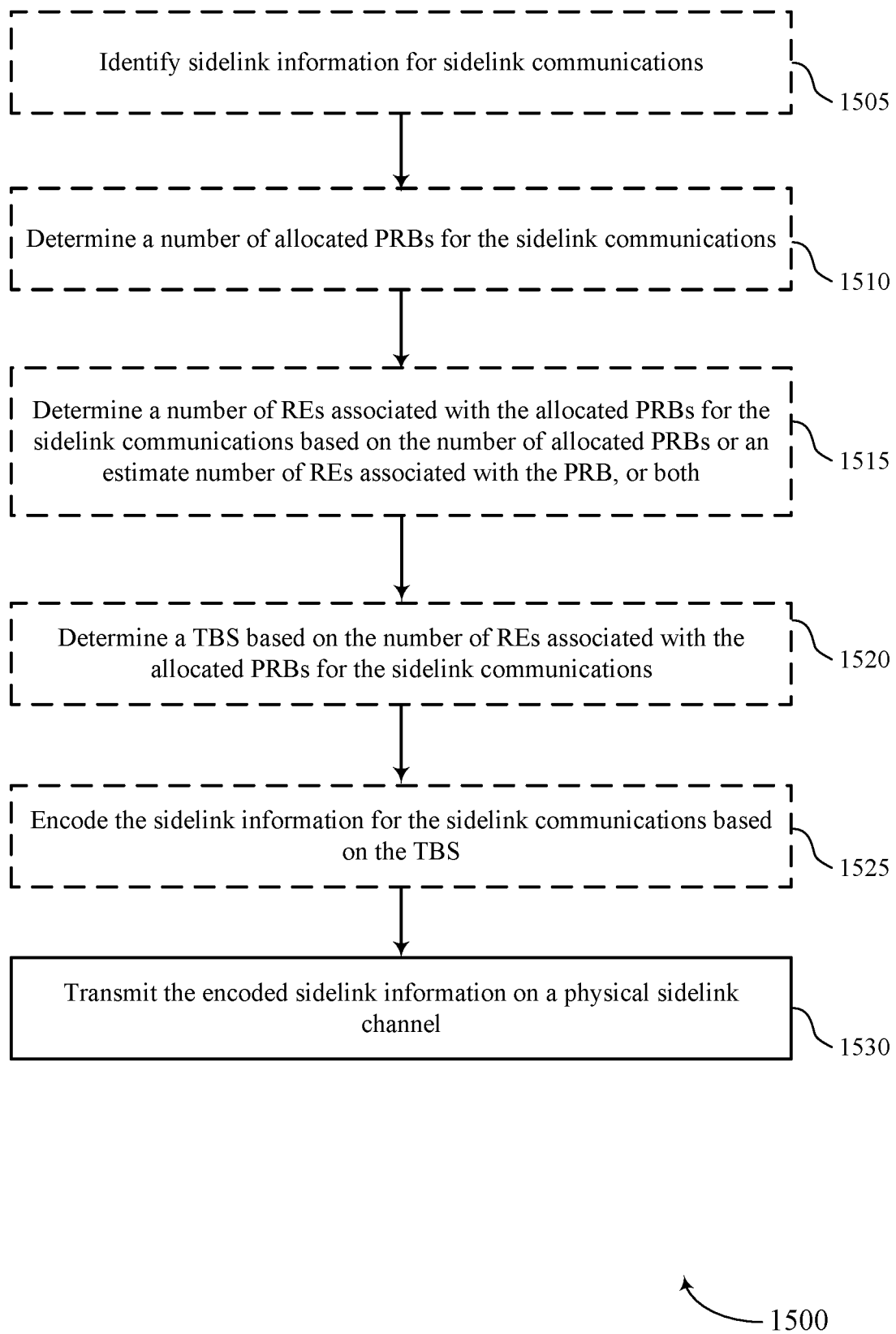

FIG. 15 shows a flowchart illustrating a method 1500 that supports sidelink communications in accordance with one or more aspects of the present disclosure. The operations of method 1500 may be implemented by a device or its components as described herein. For example, the operations of method 1500 may be performed by a UE communications manager as described with reference to FIGS. 5 through 8. In some examples, a device may execute a set of instructions to control the functional elements of the device to perform the functions described herein. Additionally or alternatively, a device may perform aspects of the functions described herein using special-purpose hardware.

At 1505, the device may identify sidelink information for sidelink communications. The operations of 1505 may be performed according to the methods described herein. In some examples, aspects of the operations of 1505 may be performed by a control component as described with reference to FIGS. 5 through 8.

At 1510, the device may determine a number of allocated PRBs for the sidelink communications. The operations of 1510 may be performed according to the methods described herein. In some examples, aspects of the operations of 1510 may be performed by a transport block component as described with reference to FIGS. 5 through 8.

At 1515, the device may determine a number of REs associated with the allocated PRBs for the sidelink communications based on the number of allocated PRBs or an estimate number of REs associated with the PRB, or both. The operations of 1515 may be performed according to the methods described herein. In some examples, aspects of the operations of 1515 may be performed by a transport block component as described with reference to FIGS. 5 through 8.

At 1520, the device may determine a TBS based on the number of REs associated with the allocated PRBs for the sidelink communications. The operations of 1520 may be performed according to the methods described herein. In some examples, aspects of the operations of 1520 may be performed by a transport block component as described with reference to FIGS. 5 through 8.

At 1525, the device may encode the sidelink information for the sidelink communications based on the TBS. The operations of 1525 may be performed according to the methods described herein. In some examples, aspects of the operations of 1525 may be performed by a control component as described with reference to FIGS. 5 through 8.

At 1530, the device may transmit the encoded sidelink information on a physical sidelink channel. The operations of 1530 may be performed according to the methods described herein. In some examples, aspects of the operations of 1530 may be performed by a sidelink component as described with reference to FIGS. 5 through 8.

Figure 16:
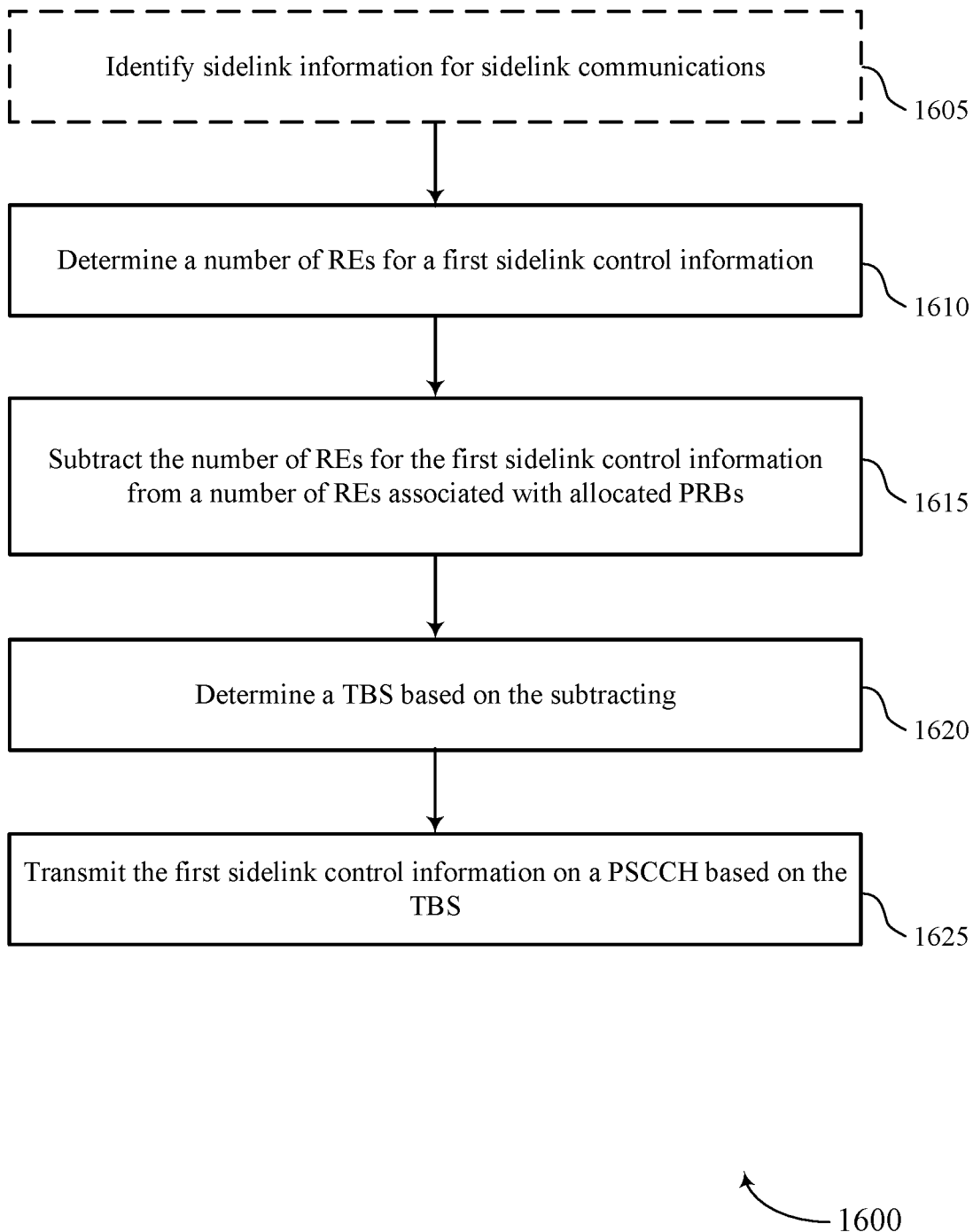

FIG. 16 shows a flowchart illustrating a method 1600 that supports sidelink communications in accordance with one or more aspects of the present disclosure. The operations of method 1600 may be implemented by a device or its components as described herein. For example, the operations of method 1600 may be performed by a UE communications manager as described with reference to FIGS. 5 through 8. In some examples, a device may execute a set of instructions to control the functional elements of the device to perform the functions described herein. Additionally or alternatively, a device may perform aspects of the functions described herein using special-purpose hardware.

At 1605, the device may identify sidelink information for sidelink communications. The operations of 1605 may be performed according to the methods described herein. In some examples, aspects of the operations of 1605 may be performed by a control component as described with reference to FIGS. 5 through 8.

At 1610, the device may determine a number of REs for a first SCI. The operations of 1615 may be performed according to the methods described herein. In some examples, aspects of the operations of 1615 may be performed by a transport block component as described with reference to FIGS. 5 through 8.

At 1615, the device may subtract the number of REs for the first SCI from a number of REs associated with allocated PRBs. The operations of 1620 may be performed according to the methods described herein. In some examples, aspects of the operations of 1620 may be performed by a transport block component as described with reference to FIGS. 5 through 8.

At 1620, the device may determine a TBS based on the subtracting. The operations of 1625 may be performed according to the methods described herein. In some examples, aspects of the operations of 1625 may be performed by a transport block component as described with reference to FIGS. 5 through 8.

At 1625, the device may transmit the first SCI on a PSCCH based on the TBS. The operations of 1630 may be performed according to the methods described herein. In some examples, aspects of the operations of 1630 may be performed by a sidelink component as described with reference to FIGS. 5 through 8.

Figure 17:
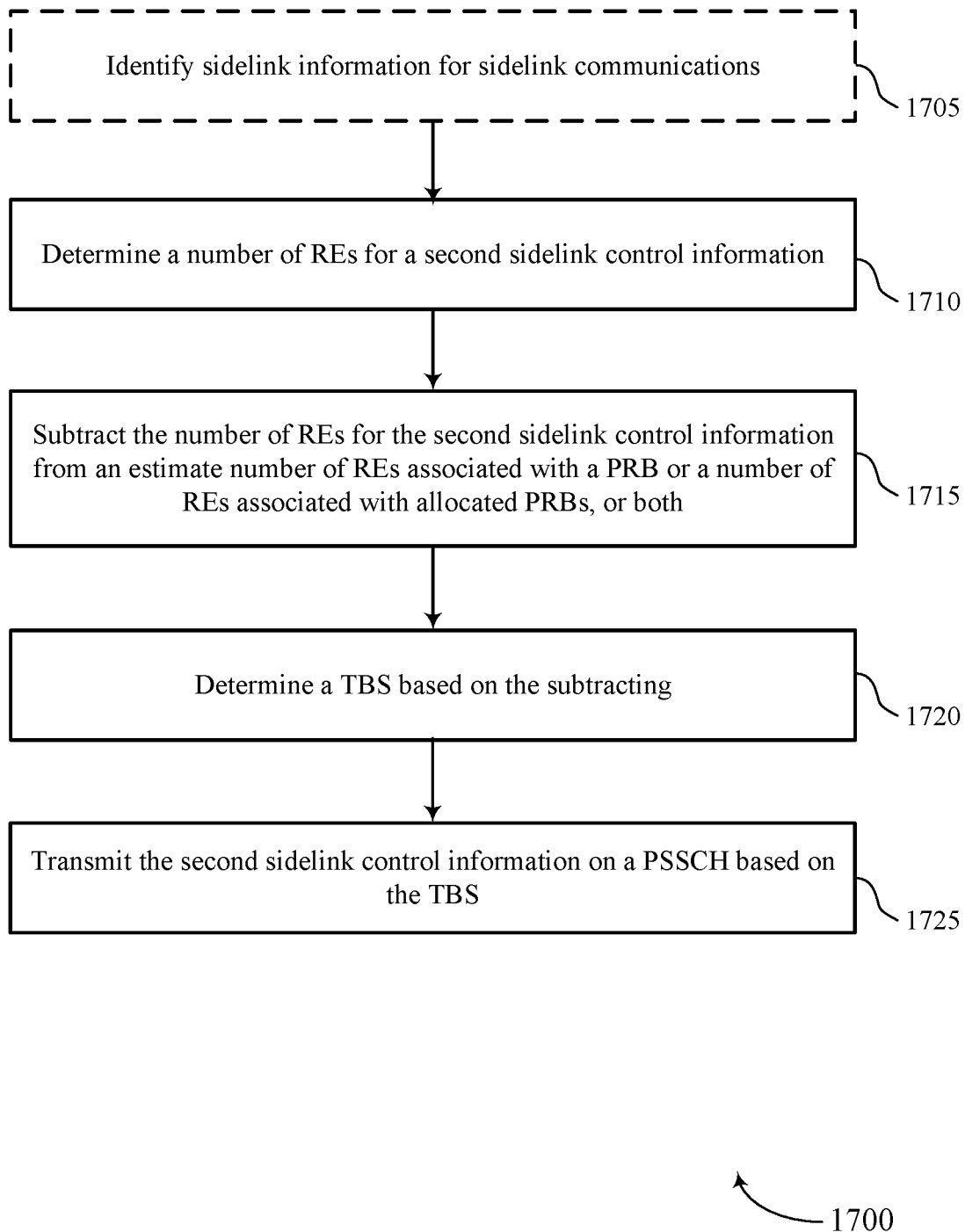

FIG. 17 shows a flowchart illustrating a method 1700 that supports sidelink communications in accordance with one or more aspects of the present disclosure. The operations of method 1700 may be implemented by a device or its components as described herein. For example, the operations of method 1700 may be performed by a UE communications manager as described with reference to FIGS. 5 through 8. In some examples, a device may execute a set of instructions to control the functional elements of the device to perform the functions described herein. Additionally or alternatively, a device may perform aspects of the functions described herein using special-purpose hardware.

At 1705, the device may identify sidelink information for sidelink communications. The operations of 1705 may be performed according to the methods described herein. In some examples, aspects of the operations of 1705 may be performed by a control component as described with reference to FIGS. 5 through 8.

At 1710, the device may determine a number of REs for a second SCI. The operations of 1710 may be performed according to the methods described herein. In some examples, aspects of the operations of 1710 may be performed by a transport block component as described with reference to FIGS. 5 through 8.

At 1715, the device may subtract the number of REs for the second SCI from an estimate number of REs associated with the PRB or a number of REs associated with allocated PRBs, or both. The operations of 1715 may be performed according to the methods described herein. In some examples, aspects of the operations of 1715 may be performed by a transport block component as described with reference to FIGS. 5 through 8.

At 1720, the device may determine a TBS based on the subtracting. The operations of 1720 may be performed according to the methods described herein. In some examples, aspects of the operations of 1720 may be performed by a transport block component as described with reference to FIGS. 5 through 8.

At 1725, the device may transmit the second SCI on a PSCCH based on the TBS. The operations of 1725 may be performed according to the methods described herein. In some examples, aspects of the operations of 1725 may be performed by a sidelink component as described with reference to FIGS. 5 through 8.

Figure 18:
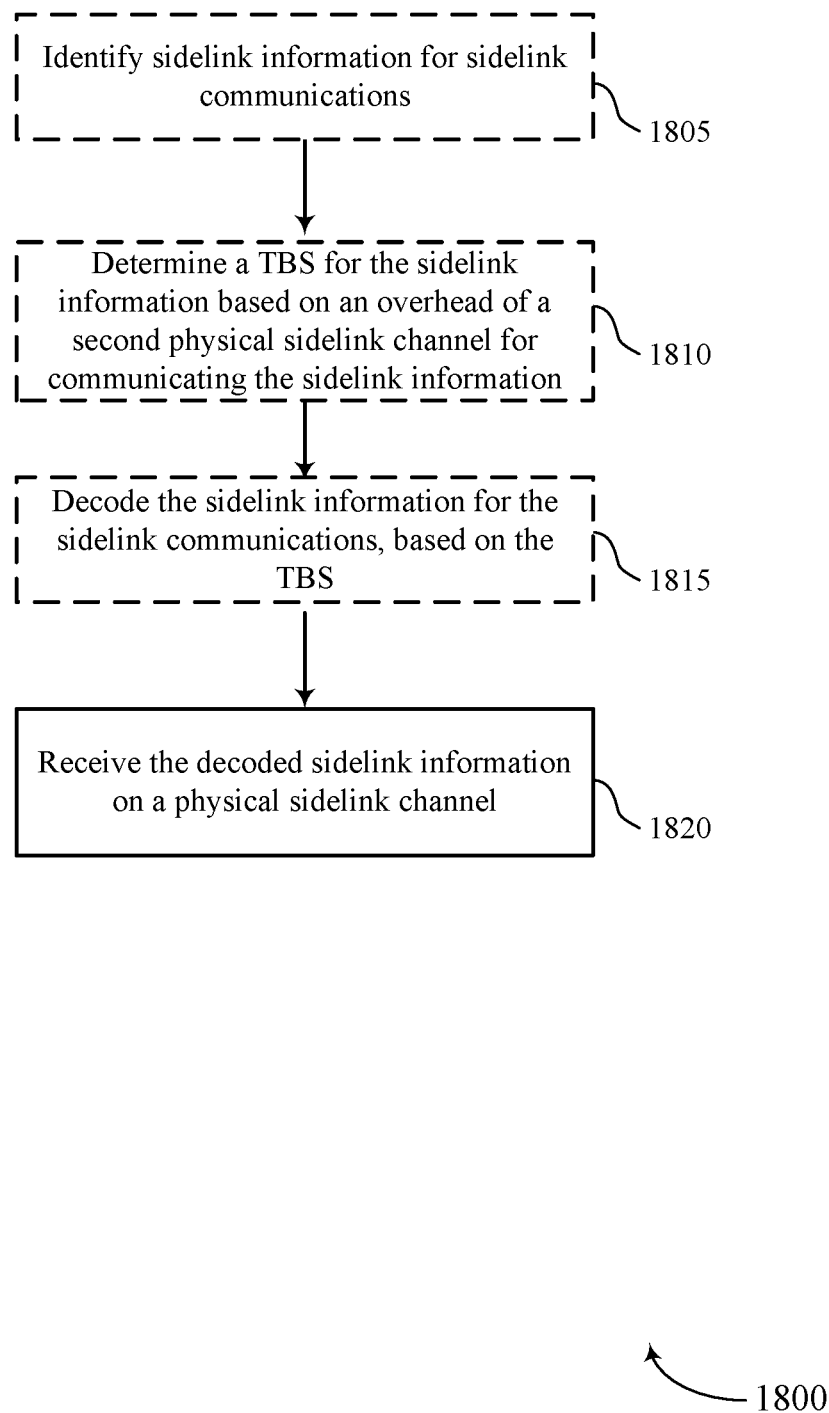

FIG. 18 shows a flowchart illustrating a method 1800 that supports sidelink communications in accordance with one or more aspects of the present disclosure. The operations of method 1800 may be implemented by a device or its components as described herein. For example, the operations of method 1800 may be performed by a UE communications manager as described with reference to FIGS. 5 through 8. In some examples, a device may execute a set of instructions to control the functional elements of the device to perform the functions described herein. Additionally or alternatively, a device may perform aspects of the functions described herein using special-purpose hardware.

At 1805, the device may identify sidelink information for sidelink communications. The operations of 1805 may be performed according to the methods described herein. In some examples, aspects of the operations of 1805 may be performed by a control component as described with reference to FIGS. 5 through 8.

At 1810, the device may determine a TBS for the sidelink information based on an overhead of a second physical sidelink channel for communicating the sidelink information. The operations of 1810 may be performed according to the methods described herein. In some examples, aspects of the operations of 1810 may be performed by a transport block component as described with reference to FIGS. 5 through 8.

At 1815, the device may decode the sidelink information for the sidelink communications based on the TBS. The operations of 1815 may be performed according to the methods described herein. In some examples, aspects of the operations of 1815 may be performed by a control component as described with reference to FIGS. 5 through 8.

At 1820, the device may receive the decoded sidelink information on a physical sidelink channel. The operations of 1820 may be performed according to the methods described herein. In some examples, aspects of the operations of 1820 may be performed by a sidelink component as described with reference to FIGS. 5 through 8.

Figure 19:
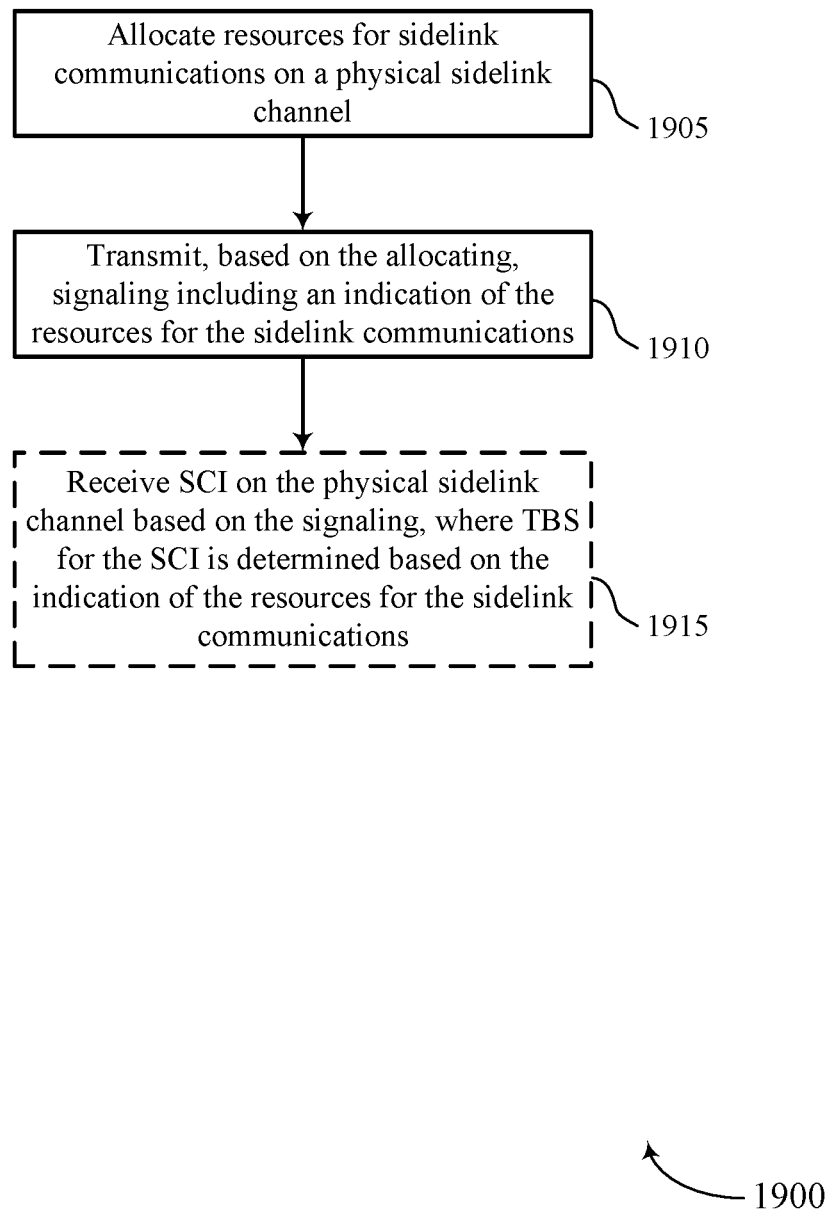

FIG. 19 shows a flowchart illustrating a method 1900 that supports sidelink communications in accordance with one or more aspects of the present disclosure. The operations of method 1900 may be implemented by a device (e.g., a base station) or its components as described herein. For example, the operations of method 1900 may be performed by a base station communications manager as described with reference to FIGS. 9 through 12. In some examples, a device may execute a set of instructions to control the functional elements of the device to perform the functions described herein. Additionally or alternatively, a device may perform aspects of the functions described herein using special-purpose hardware.

At 1905, the device may allocate resources for sidelink communications on a physical sidelink channel. The operations of 1905 may be performed according to the methods described herein. In some examples, aspects of the operations of 1905 may be performed by a resource component as described with reference to FIGS. 9 through 12.

At 1910, the device may transmit, based on the allocating, signaling including an indication of the resources for the sidelink communications. The operations of 1910 may be performed according to the methods described herein. In some examples, aspects of the operations of 1910 may be performed by a signaling component as described with reference to FIGS. 9 through 12.

At 1915, the device may receive SCI on the physical sidelink channel based on the signaling, where TBS for the SCI is determined based on the indication of the resources for the sidelink communications. The operations of 1915 may be performed according to the methods described herein. In some examples, aspects of the operations of 1915 may be performed by a sidelink component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication, comprising: encoding sidelink information for sidelink communications based on a TBS, and transmitting the encoded sidelink information on a physical sidelink channel, the transport block size based at least in part on an overhead of a second physical sidelink channel for communicating the sidelink information.

Aspect 2: The method of aspect 1, further comprising: determining an estimate number of resource elements associated with a physical resource block for sidelink communications, wherein the transport block size is based at least in part on the estimate number of resource elements associated with the physical resource block.

Aspect 3: The method of aspect 2, further comprising: determining a number of allocated physical resource blocks for the sidelink communications; and determining a number of resource elements associated with the allocated physical resource blocks for the sidelink communications based at least in part on the number of allocated physical resource blocks or the estimate number of resource elements associated with the physical resource block, or both, wherein the transport block size is based at least in part on the number of resource elements associated with the allocated physical resource blocks for the sidelink communications.

Aspect 4: The method of aspect 3, further comprising: transmitting signaling comprising an indication of a number of symbols to use for the transport block size determination, wherein the transport block size is based at least in part on the signaling.

Aspect 5: The method of aspect 4, further comprising: determining a number of allocated symbols associated with the physical sidelink channel, the physical sidelink channel comprising a physical sidelink control channel; and subtracting the number of symbols to use for the transport block size determination from the number of allocated symbols associated with the physical sidelink channel, wherein determining the estimate number of resource elements associated with the physical resource block is based at least in part on the subtracting.

Aspect 6: The method of any of aspects 4 through 5, wherein determining the estimate number of resource elements associated with the physical resource block is based at least in part on the number of symbols to use for the transport block size determination.

Aspect 7: The method of any of aspects 3 through 6, further comprising: determining a number of resource elements for a first sidelink control information; and subtracting the number of resource elements for the first sidelink control information from the number of resource elements associated with the allocated physical resource blocks, wherein the transport block size is based at least in part on the subtracting.

Aspect 8: The method of aspect 7, wherein transmitting the sidelink information on the physical sidelink channel comprises: transmitting the first sidelink control information on a physical sidelink control channel based at least in part on the transport block size.

Aspect 9: The method of any of aspects 7 through 8, further comprising: determining that a first physical sidelink channel and the second physical sidelink channel are frequency division multiplexed, the first physical sidelink channel comprises a physical sidelink shared channel and the second physical sidelink channel comprises a physical sidelink control channel, wherein the transport block size is based at least in part on that the first physical sidelink channel and the second physical sidelink channel are frequency division multiplexed.

Aspect 10: The method of aspect 9, further comprising: determining that the physical sidelink shared channel occupies the number of resource elements associated with the allocated physical resource blocks; and adjusting an overhead of the physical sidelink control channel based at least in part on a value of the number of resource elements occupied by the physical sidelink shared channel, wherein the overhead of the physical sidelink control channel is per slot.

Aspect 11: The method of any of aspects 7 through 10, further comprising: determining that a first physical sidelink channel and the second physical sidelink channel are time division multiplexed, the first physical sidelink channel comprises a physical sidelink shared channel and the second physical sidelink channel comprises a physical sidelink control channel, wherein the transport block size is based at least in part on determining that the first physical sidelink channel and the second physical sidelink channel are time division multiplexed.

Aspect 12: The method of aspect 11, further comprising: determining an overhead of the physical sidelink control channel per physical resource block based at least in part on determining that the first physical sidelink channel and the second physical sidelink channel are time division multiplexed, wherein the transport block size is based at least in part on the overhead of the physical sidelink control channel being per physical resource block.

Aspect 13: The method of any of aspects 11 through 12, further comprising: determining a number of symbols associated with the physical sidelink control channel or the physical sidelink shared channel, or both; determining a number of symbols exclusively including the physical sidelink control channel; and excluding the number of symbols exclusively including the physical sidelink control channel from the estimate number of resource elements associated with the physical resource block or the number of resource elements associated with the allocated physical resource blocks, or both, wherein the transport block size is based at least in part on the excluding.

Aspect 14: The method of any of aspects 11 through 13, wherein the transport block size is based at least in part on the overhead of the physical sidelink control channel being per slot.

Aspect 15: The method of any of aspects 3 through 14, further comprising: determining a number of resource elements for a second sidelink control information; and subtracting the number of resource elements for the second sidelink control information from the estimate number of resource elements associated with the physical resource block or the number of resource elements associated with the allocated physical resource blocks, or both, wherein the transport block size is based at least in part on the subtracting.

Aspect 16: The method of aspect 15, further comprising: determining a control overhead associated with the second sidelink control information based at least in part on a target code rate associated with a modulation coding scheme, wherein the transport block size is based at least in part on the control overhead associated with the second sidelink control information.

Aspect 17: The method of any of aspects 15 through 16, further comprising: determining a control overhead associated with the second sidelink control information; and ignoring the control overhead associated with the second sidelink control information, wherein the transport block size is based at least in part on ignoring the control overhead associated with the second sidelink control information.

Aspect 18: The method of any of aspects 15 through 17, further comprising: identifying a modulation coding scheme for the sidelink communications; and identifying a target code rate based at least in part on the modulation coding scheme for the sidelink communications, wherein determining the number of resource elements for the second sidelink control information is based at least in part on the target code rate.

Aspect 19: The method of any of aspects 15 through 18, wherein transmitting the sidelink information on the physical sidelink channel comprises: transmitting the second sidelink control information on a physical sidelink shared channel based at least in part on the transport block size.

Aspect 20: The method of any of aspects 3 through 19, further comprising: transmitting signaling comprising an indication of an overhead value, wherein determining the estimate number of resource elements associated with the physical resource block is based at least in part on the signaled overhead value.

Aspect 21: The method of any of aspects 3 through 20, further comprising: transmitting signaling comprising an indication of an offset overhead value relative to a demodulation reference signal pattern, wherein determining the estimate number of resource elements associated with the physical resource block is based at least in part on the signaled offset overhead value.

Aspect 22: The method of any of aspects 3 through 21, further comprising: adjusting the number of resource elements associated with the allocated physical resource blocks for the sidelink communications to a number of resource elements associated with the allocated physical resource blocks for non-sidelink communications.

Aspect 23: The method of any of aspects 3 through 22, further comprising: determining a channel state information reference signal overhead; and refraining from using the channel state information reference signal overhead from determining the estimate number of resource elements associated with the physical resource block or determining the number of resource elements associated with the allocated physical resource blocks, or both, wherein the transport block size is based at least in part on the ignoring.

Aspect 24: A method for wireless communication, comprising: decoding sidelink information for sidelink communications based on a TBS, and receiving the decoded sidelink information on a physical sidelink channel, the transport block size based at least in part on an overhead of a second physical sidelink channel for communicating the sidelink information.

Aspect 25: The method of aspect 24, further comprising: determining an estimate number of resource elements associated with a physical resource block for sidelink communications, wherein the transport block size is based at least in part on the estimate number of resource elements associated with the physical resource block.

Aspect 26: The method of aspect 25, further comprising: determining a number of allocated physical resource blocks for the sidelink communications; and determining a number of resource elements associated with the allocated physical resource blocks for the sidelink communications based at least in part on the number of allocated physical resource blocks or the estimate number of resource elements associated with the physical resource block, or both, wherein the transport block size is based at least in part on the number of resource elements associated with the allocated physical resource blocks for the sidelink communications.

Aspect 27: The method of aspect 26, further comprising: determining a number of resource elements for a first sidelink control information; and subtracting the number of resource elements for the first sidelink control information from the number of resource elements associated with the allocated physical resource blocks, wherein the transport block size is based at least in part on the subtracting.

Aspect 28: A method for wireless communication, comprising: identifying sidelink control information for sidelink communications; determining a transport block size for the sidelink control information; and transmitting the sidelink control information on a physical sidelink channel based at least in part on the transport block size.

Aspect 29: The method of aspect 28, further comprising: determining an estimate number of resource elements associated with a physical resource block for the sidelink communications, wherein determining the transport block size is based at least in part on the estimate number of resource elements associated with the physical resource block.

Aspect 30: The method of aspect 29, further comprising: determining a number of allocated physical resource blocks for the sidelink communications; and determining a number of resource elements associated with the physical resource block for the sidelink communications based at least in part on the number of allocated physical resource blocks or the estimate number of resource elements associated with the physical resource block, or both, wherein determining the transport block size is based at least in part on the number of resource elements associated with the physical resource block for the sidelink communications.

Aspect 31: The method of aspect 30, further comprising: determining a number of resource elements for a first sidelink control information; and subtracting the number of resource elements for the first sidelink control information from the estimate number of resource elements associated with the physical resource block or the number of resource elements associated with the physical resource block, or both, wherein determining the transport block size is based at least in part on the subtracting.

Aspect 32: The method of aspect 31, further comprising: determining control overhead associated with the first sidelink control information; and refraining from using the control overhead in the estimate number of resource elements associated with the physical resource block or the number of resource elements associated with the physical resource block, or both, wherein determining the transport block size is based at least in part on the refraining.

Aspect 33: The method of any of aspects 31 through 32, wherein transmitting the sidelink control information on the physical sidelink channel comprises: transmitting the first sidelink control information on a physical sidelink control channel based at least in part on the transport block size.

Aspect 34: The method of any of aspects 31 through 33, further comprising: determining that a first physical sidelink channel and a second physical sidelink channel are frequency division multiplexed, the first physical sidelink channel comprises a physical sidelink shared channel and the second physical sidelink channel comprises a physical sidelink control channel, wherein determining the transport block size is based at least in part on that the first physical sidelink channel and the second physical sidelink channel are frequency division multiplexed.

Aspect 35: The method of aspect 34, further comprising: determining that physical sidelink shared channel occupies the number of resource elements associated with the physical resource block; and scaling an overhead of the physical sidelink control channel by a value of the resource elements occupied by the physical sidelink shared channel.

Aspect 36: The method of any of aspects 31 through 35, wherein determining the transport block size is based at least in part on the overhead of the physical sidelink control channel per slot.

Aspect 37: The method of any of aspects 31 through 36, further comprising: determining that a first physical sidelink channel and a second physical sidelink channel are time division multiplexed, the first physical sidelink channel comprises a physical sidelink shared channel and the second physical sidelink channel comprises a physical sidelink control channel, wherein determining the transport block size is based at least in part on that the first physical sidelink channel and the second physical sidelink channel are time division multiplexed.

Aspect 38: The method of aspect 37, further comprising: determining an overhead of the physical sidelink control channel per physical resource block based at least in part on that the first sidelink channel and the second physical sidelink channel are time division multiplexed, wherein determining the transport block size is based at least in part on the overhead of the physical sidelink control channel per physical resource block.

Aspect 39: The method of any of aspects 37 through 38, further comprising: determining a number of symbols associated with the physical sidelink control channel or the physical sidelink shared channel, or both; determining a number of symbols exclusively including the physical sidelink control channel; and excluding the number of symbols exclusively including the physical sidelink control channel from the estimate number of resource elements associated with the physical resource block or the number of resource elements associated with the physical resource block, or both, wherein determining the transport block size is based at least in part on the excluding.

Aspect 40: The method of any of aspects 37 through 39, wherein determining the transport block size is based at least in part on an overhead of the physical sidelink control channel per slot.

Aspect 41: The method of any of aspects 30 through 40, further comprising: determining a number of resource elements for a second sidelink control information; and subtracting the number of resource elements for the second sidelink control information from the estimate number of resource elements associated with the physical resource block or the number of resource elements associated with the physical resource block, or both, wherein determining the transport block size is based at least in part on the subtracting.

Aspect 42: The method of aspect 41, further comprising: determining a control overhead associated with the second sidelink control information based at least in part on a target code rate associated with a modulation coding scheme, wherein determining the transport block size is based at least in part on the control overhead associated with the second sidelink control information.

Aspect 43: The method of any of aspects 41 through 42, further comprising: ignoring the control overhead associated with the second sidelink control information, wherein determining the transport block size is based at least in part on ignoring the control overhead associated with the second sidelink control information.

Aspect 44: The method of any of aspects 41 through 43, further comprising: identifying a modulation coding scheme for the second sidelink control information; and identifying a target code rate based at least in part on the modulation coding scheme for second sidelink control information, wherein determining the number of resource elements for the second sidelink control information is based at least in part on the target code rate.

Aspect 45: The method of any of aspects 41 through 44, wherein transmitting the sidelink control information on the physical sidelink channel comprises: transmitting the second sidelink control information on a physical sidelink shared channel based at least in part on the transport block size.

Aspect 46: The method of any of aspects 30 through 45, further comprising: transmitting signaling comprising an indication of an overhead value, wherein determining the estimate number of resource elements associated with the physical resource block is based at least in part on the signaled overhead value.

Aspect 47: The method of any of aspects 30 through 46, further comprising: transmitting signaling comprising an indication of an offset overhead value relative to a demodulation reference signal pattern, wherein determining the estimate number of resource elements associated with the physical resource block is based at least in part on the signaled offset overhead value.

Aspect 48: The method of any of aspects 30 through 47, further comprising: transmitting signaling comprising an indication of a number of symbols to use for the transport block size determination, wherein determining the transport block size is based at least in part on the signaling.

Aspect 49: The method of aspect 48, further comprising: determining a number of allocated symbols associated with the physical sidelink channel, the physical sidelink channel comprising a physical sidelink control channel; and subtracting the number of symbols to use for the transport block size determination from the number of allocated symbols associated with the physical sidelink channel, wherein determining the estimate number of resource elements associated with the physical resource block is based at least in part on the subtracting.

Aspect 50: The method of any of aspects 48 through 49, wherein determining the estimate number of resource elements associated with the physical resource block is based at least in part on the number of symbols to use for the transport block size determination.

Aspect 51: The method of any of aspects 30 through 50, further comprising: adjusting the number of resource elements associated with the physical resource block for the sidelink communications to a number of resource elements associated with the physical resource block for non-sidelink communications.

Aspect 52: The method of any of aspects 30 through 51, further comprising: determining a channel state information reference signal overhead; and refraining from using the channel state information reference signal overhead from determining the estimate number of resource elements associated with the physical resource block or determining the number of resource elements associated with the physical resource block, or both, wherein determining the transport block size is based at least in part on the ignoring.

Aspect 53: The method of any of aspects 29 through 52, further comprising: determining a number of subcarriers associated with the physical resource block, wherein determining the estimate number of resource elements associated with the physical resource block is based at least in part on the number of subcarriers associated with the physical resource block.

Aspect 54: The method of any of aspects 29 through 53, further comprising: determining a number of allocated symbols associated with a physical sidelink channel, wherein determining the estimate number of resource elements associated with the physical resource block is based at least in part on one or more of the number of subcarriers associated with the physical resource block and the number of allocated symbols associated with the physical sidelink channel.

Aspect 55: The method of any of aspects 29 through 54, further comprising: determining a demodulation reference signal overhead associated with the physical resource block, wherein determining the estimate number of resource elements associated with the physical resource block is based at least in part on the demodulation reference signal overhead associated with the physical resource block.

Aspect 56: The method of any of aspects 29 through 55, further comprising: determining control overhead associated with the physical resource block, wherein determining the estimate number of resource elements associated with the physical resource block is based at least in part on the control overhead associated with the physical resource block.

Aspect 57: The method of any of aspects 28 through 56, further comprising: determining an overhead of the physical sidelink channel based at least in part on a period of the physical sidelink channel, wherein determining the transport block size is based at least in part on the overhead of the physical sidelink channel.

Aspect 58: The method of aspect 57, wherein the physical sidelink channel comprises a physical sidelink feedback channel.

Aspect 59: The method of any of aspects 57 through 58, further comprising: scaling the overhead of the physical sidelink channel based at least in part on the period of the physical sidelink channel, wherein determining the transport block size is based at least in part on the scaling.

Aspect 60: The method of any of aspects 57 through 59, further comprising: determining an average of the overhead of the physical sidelink channel over the period of the physical sidelink channel, wherein determining the transport block size is based at least in part on the average of the overhead of the physical sidelink channel over the period of the physical sidelink channel.

Aspect 61: The method of any of aspects 57 through 60, further comprising: applying the overhead of the physical sidelink channel as a value per physical resource block, wherein determining the transport block size is based at least in part on the applying.

Aspect 62: The method of any of aspects 57 through 61, wherein the overhead of the physical sidelink channel corresponds to a number of available symbols of a second physical sidelink channel, the second physical sidelink channel comprising a physical sidelink shared channel.

Aspect 63: The method of any of aspects 28 through 62, wherein the physical sidelink channel comprises a physical sidelink shared channel.

Aspect 64: The method of any of aspects 28 through 63, wherein the physical sidelink channel comprises a physical sidelink control channel.

Aspect 65: A method for wireless communication, comprising: identifying sidelink control information for sidelink communications; determining a transport block size for the sidelink control information; and receiving the sidelink control information on a physical sidelink channel based at least in part on the transport block size.

Aspect 66: The method of aspect 65, further comprising: determining an estimate number of resource elements associated with a physical resource block for the sidelink communications, wherein determining the transport block size is based at least in part on the estimate number of resource elements associated with the physical resource block.

Aspect 67: The method of aspect 66, further comprising: determining a number of allocated physical resource blocks for the sidelink communications; and determining a number of resource elements associated with the physical resource block for the sidelink communications based at least in part on the number of allocated physical resource blocks or the estimate number of resource elements associated with the physical resource block, or both, wherein determining the transport block size is based at least in part on the number of resource elements associated with the physical resource block for the sidelink communications.

Aspect 68: The method of aspect 67, further comprising: determining a number of resource elements for a first sidelink control information; and subtracting the number of resource elements for the first sidelink control information from the estimate number of resource elements associated with the physical resource block or the number of resource elements associated with the physical resource block, or both, wherein determining the transport block size is based at least in part on the subtracting.

Aspect 69: The method of aspect 68, further comprising: determining control overhead associated with the first sidelink control information; and refraining from using the control overhead in the estimate number of resource elements associated with the physical resource block or the number of resource elements associated with the physical resource block, or both, wherein determining the transport block size is based at least in part on the refraining.

Aspect 70: The method of any of aspects 68 through 69, wherein receiving the sidelink control information on the physical sidelink channel comprises: receiving the first sidelink control information on a physical sidelink control channel based at least in part on the transport block size.

Aspect 71: The method of any of aspects 68 through 70, further comprising: determining that a first physical sidelink channel and a second physical sidelink channel are frequency division multiplexed, the first physical sidelink channel comprises a physical sidelink shared channel and the second physical sidelink channel comprises a physical sidelink control channel, wherein determining the transport block size is based at least in part on that the first physical sidelink channel and the second physical sidelink channel are frequency division multiplexed.

Aspect 72: The method of any of aspects 68 through 71, further comprising: determining that physical sidelink shared channel occupies the number of resource elements associated with the physical resource block; and scaling an overhead of the physical sidelink control channel by a value of the resource elements occupied by the physical sidelink shared channel.

Aspect 73: The method of any of aspects 68 through 72, wherein determining the transport block size is based at least in part on the overhead of the physical sidelink control channel per slot.

Aspect 74: The method of any of aspects 68 through 73, further comprising: determining that a first physical sidelink channel and a second physical sidelink channel are time division multiplexed, the first physical sidelink channel comprises a physical sidelink shared channel and the second physical sidelink channel comprises a physical sidelink control channel, wherein determining the transport block size is based at least in part on that the first physical sidelink channel and the second physical sidelink channel are time division multiplexed.

Aspect 75: The method of aspect 74, further comprising: determining an overhead of the physical sidelink control channel per physical resource block based at least in part on that the first sidelink channel and the second physical sidelink channel are time division multiplexed, wherein determining the transport block size is based at least in part on the overhead of the physical sidelink control channel per physical resource block.

Aspect 76: The method of any of aspects 74 through 75, further comprising: determining a number of symbols associated with the physical sidelink control channel or the physical sidelink shared channel, or both; determining a number of symbols exclusively including the physical sidelink control channel; and excluding the number of symbols exclusively including the physical sidelink control channel from the estimate number of resource elements associated with the physical resource block or the number of resource elements associated with the physical resource block, or both, wherein determining the transport block size is based at least in part on the excluding.

Aspect 77: The method of any of aspects 74 through 76, wherein determining the transport block size is based at least in part on an overhead of the physical sidelink control channel per slot.

Aspect 78: The method of any of aspects 67 through 77, further comprising: determining a number of resource elements for a second sidelink control information; and subtracting the number of resource elements for the second sidelink control information from the estimate number of resource elements associated with the physical resource block or the number of resource elements associated with the physical resource block, or both, wherein determining the transport block size is based at least in part on the subtracting.

Aspect 79: The method of aspect 78, further comprising: determining a control overhead associated with the second sidelink control information based at least in part on a target code rate associated with a modulation coding scheme, wherein determining the transport block size is based at least in part on the control overhead associated with the second sidelink control information.

Aspect 80: The method of any of aspects 78 through 79, further comprising: ignoring the control overhead associated with the second sidelink control information, wherein determining the transport block size is based at least in part on ignoring the control overhead associated with the second sidelink control information.

Aspect 81: The method of any of aspects 78 through 80, further comprising: identifying a modulation coding scheme for the second sidelink control information; and identifying a target code rate based at least in part on the modulation coding scheme for second sidelink control information, wherein determining the number of resource elements for the second sidelink control information is based at least in part on the target code rate.

Aspect 82: The method of any of aspects 78 through 81, wherein receiving the sidelink control information on the physical sidelink channel comprises: receiving the second sidelink control information on a physical sidelink shared channel based at least in part on the transport block size.

Aspect 83: The method of any of aspects 67 through 82, further comprising: receiving signaling comprising an indication of an overhead value, wherein determining the estimate number of resource elements associated with the physical resource block is based at least in part on the signaled overhead value.

Aspect 84: The method of any of aspects 67 through 83, further comprising: receiving signaling comprising an indication of an offset overhead value relative to a demodulation reference signal pattern, wherein determining the estimate number of resource elements associated with the physical resource block is based at least in part on the signaled offset overhead value.

Aspect 85: The method of any of aspects 67 through 84, further comprising: receiving signaling comprising an indication of a number of symbols to use for the transport block size determination, wherein determining the transport block size is based at least in part on the signaling.

Aspect 86: The method of aspect 85, further comprising: determining a number of allocated symbols associated with the physical sidelink channel, the physical sidelink channel comprising a physical sidelink control channel; and subtracting the number of symbols to use for the transport block size determination from the number of allocated symbols associated with the physical sidelink channel, wherein determining the estimate number of resource elements associated with the physical resource block is based at least in part on the subtracting.

Aspect 87: The method of any of aspects 85 through 86, wherein determining the estimate number of resource elements associated with the physical resource block is based at least in part on the number of symbols to use for the transport block size determination.

Aspect 88: The method of any of aspects 67 through 87, further comprising: adjusting the number of resource elements associated with the physical resource block for the sidelink communications to a number of resource elements associated with the physical resource block for non-sidelink communications.

Aspect 89: The method of any of aspects 67 through 88, further comprising: determining a channel state information reference signal overhead; and refraining from using the channel state information reference signal overhead from determining the estimate number of resource elements associated with the physical resource block or determining the number of resource elements associated with the physical resource block, or both, wherein determining the transport block size is based at least in part on the ignoring.

Aspect 90: The method of any of aspects 66 through 89, further comprising: determining a number of subcarriers associated with the physical resource block, wherein determining the estimate number of resource elements associated with the physical resource block is based at least in part on the number of subcarriers associated with the physical resource block.

Aspect 91: The method of any of aspects 66 through 90, further comprising: determining a number of allocated symbols associated with a physical sidelink channel, wherein determining the estimate number of resource elements associated with the physical resource block is based at least in part on one or more of the number of subcarriers associated with the physical resource block and the number of allocated symbols associated with the physical sidelink channel.

Aspect 92: The method of any of aspects 66 through 91, further comprising: determining a demodulation reference signal overhead associated with the physical resource block, wherein determining the estimate number of resource elements associated with the physical resource block is based at least in part on the demodulation reference signal overhead associated with the physical resource block.

Aspect 93: The method of any of aspects 66 through 92, further comprising: determining control overhead associated with the physical resource block, wherein determining the estimate number of resource elements associated with the physical resource block is based at least in part on the control overhead associated with the physical resource block.

Aspect 94: The method of any of aspects 65 through 93, further comprising: determining an overhead of the physical sidelink channel based at least in part on a period of the physical sidelink channel, wherein determining the transport block size is based at least in part on the overhead of the physical sidelink channel.

Aspect 95: The method of aspect 94, wherein the physical sidelink channel comprises a physical sidelink feedback channel.

Aspect 96: The method of any of aspects 94 through 95, further comprising: scaling the overhead of the physical sidelink channel based at least in part on the period of the physical sidelink channel, wherein determining the transport block size is based at least in part on the scaling.

Aspect 97: The method of any of aspects 94 through 96, further comprising: determining an average of the overhead of the physical sidelink channel over the period of the physical sidelink channel, wherein determining the transport block size is based at least in part on the average of the overhead of the physical sidelink channel over the period of the physical sidelink channel.

Aspect 98: The method of any of aspects 94 through 97, further comprising: applying the overhead of the physical sidelink channel as a value per physical resource block, wherein determining the transport block size is based at least in part on the applying.

Aspect 99: The method of any of aspects 94 through 98, wherein the overhead of the physical sidelink channel corresponds to a number of available symbols of a second physical sidelink channel, the second physical sidelink channel comprising a physical sidelink shared channel.

Aspect 100: The method of any of aspects 65 through 99, wherein the physical sidelink channel comprises a physical sidelink shared channel.

Aspect 101: The method of any of aspects 65 through 100, wherein the physical sidelink channel comprises a physical sidelink control channel.

Aspect 102: A method for wireless communication, comprising: allocating resources for sidelink communications on a physical sidelink channel; transmitting, based at least in part on the allocating, signaling comprising an indication of the resources for the sidelink communications; and receiving sidelink control information on the physical sidelink channel based at least in part on the signaling, wherein transport block size for the sidelink control information is determined based at least in part on the indication of the resources for the sidelink communications.

Aspect 103: The method of aspect 102, wherein transmitting the signaling comprises: transmitting signaling comprising an indication of an overhead value, wherein an estimate number of resource elements associated with a physical resource block for the sidelink communications is based at least in part on the signaled overhead value.

Aspect 104: The method of any of aspects 102 through 103, wherein transmitting the signaling comprises: transmitting signaling comprising an indication of a number of symbols to use for the transport block size determination, wherein the transport block size is based at least in part on the number of symbols to use for the transport block size determination.

Aspect 105: The method of any of aspects 102 through 104, wherein the physical sidelink channel comprises a physical sidelink shared channel.

Aspect 106: The method of any of aspects 102 through 105, wherein the physical sidelink channel comprises a physical sidelink control channel.

Aspect 107: An apparatus for wireless communication, comprising a processor; and memory coupled with the processor, the processor and memory configured to perform a method of any of aspects 1 through 23.

Aspect 108: An apparatus for wireless communication, comprising at least one means for performing a method of any of aspects 1 through 23.

Aspect 109: A non-transitory computer-readable medium storing code for wireless communication, the code comprising instructions executable by a processor to perform a method of any of aspects 1 through 23.

Aspect 110: An apparatus for wireless communication, comprising a processor; and memory coupled with the processor, the processor and memory configured to perform a method of any of aspects 24 through 27.

Aspect 111: An apparatus for wireless communication, comprising at least one means for performing a method of any of aspects 24 through 27.

Aspect 112: A non-transitory computer-readable medium storing code for wireless communication, the code comprising instructions executable by a processor to perform a method of any of aspects 24 through 27.

Aspect 113: An apparatus for wireless communication, comprising a processor; and memory coupled with the processor, the processor and memory configured to perform a method of any of aspects 28 through 64.

Aspect 114: An apparatus for wireless communication, comprising at least one means for performing a method of any of aspects 28 through 64.

Aspect 115: A non-transitory computer-readable medium storing code for wireless communication, the code comprising instructions executable by a processor to perform a method of any of aspects 28 through 64.

Aspect 116: An apparatus for wireless communication, comprising a processor; and memory coupled with the processor, the processor and memory configured to perform a method of any of aspects 65 through 101.

Aspect 117: An apparatus for wireless communication, comprising at least one means for performing a method of any of aspects 65 through 101.

Aspect 118: A non-transitory computer-readable medium storing code for wireless communication, the code comprising instructions executable by a processor to perform a method of any of aspects 65 through 101.

Aspect 119: An apparatus for wireless communication, comprising a processor; and memory coupled with the processor, the processor and memory configured to perform a method of any of aspects 102 through 106.

Aspect 120: An apparatus for wireless communication, comprising at least one means for performing a method of any of aspects 102 through 106.

Aspect 121: A non-transitory computer-readable medium storing code for wireless communication, the code comprising instructions executable by a processor to perform a method of any of aspects 102 through 106.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a first user equipment (UE), comprising:
    receiving signaling comprising an indication of a demodulation reference signal pattern associated with a physical sidelink shared channel;
    encoding sidelink information based at least in part on a transport block size, wherein the transport block size is based on a first quantity of resource elements within a slot, wherein the first quantity of resource elements within the slot is based on a second quantity of resource elements within a physical resource block, and on a third quantity of resource elements associated with first-stage sidelink control information, and on a fourth quantity of resource elements associated with second-stage sidelink control information, and wherein the second quantity of resource elements within the physical resource block is based on the indicated demodulation reference signal pattern; and
    transmitting, to a second UE, the encoded sidelink information via the physical sidelink shared channel.

2. The method of claim 1, further comprising:
    determining the second quantity of resource elements within the physical resource block, the second quantity of resource elements comprising an estimate quantity of resource elements associated with the physical resource block for sidelink communications,
    wherein the transport block size is based at least in part on the second quantity of resource elements within the physical resource block.

3. The method of claim 2, further comprising:
    determining a quantity of allocated physical resource blocks for the sidelink communications; and
    determining the first quantity of resource elements within the slot and associated with the allocated physical resource blocks for the sidelink communications based at least in part on the quantity of allocated physical resource blocks or the second quantity of resource elements within the physical resource block, or both,
    wherein the transport block size is based at least in part on the first quantity of resource elements within the slot for the sidelink communications.

4. The method of claim 3, further comprising:
    transmitting signaling comprising an indication of a quantity of symbols to use for transport block size determination,
    wherein the transport block size is based at least in part on the signaling.

5. The method of claim 4, further comprising:
    determining a quantity of allocated symbols associated with a physical sidelink control channel; and
    subtracting the quantity of symbols to use for the transport block size determination from the quantity of allocated symbols associated with the physical sidelink control channel,
    wherein determining the second quantity of resource elements within the physical resource block is based at least in part on the subtracting.

6. The method of claim 4, wherein determining the second quantity of resource elements within the physical resource block is based at least in part on the quantity of symbols to use for the transport block size determination.

7. The method of claim 3, further comprising:
    subtracting the third quantity of resource elements occupied by a physical sidelink control channel that is associated with the first-stage sidelink control information from the first quantity of resource elements within the slot,
    wherein the transport block size is based at least in part on the subtracting.

8. The method of claim 7, further comprising:
    transmitting the first-stage sidelink control information on the physical sidelink control channel based at least in part on the transport block size.

9. The method of claim 7, further comprising:
    determining that the physical sidelink control channel and the physical sidelink shared channel are frequency division multiplexed,
    wherein the transport block size is based at least in part on the physical sidelink control channel and the physical sidelink shared channel being frequency division multiplexed.

10. The method of claim 9, further comprising:
    determining that the physical sidelink shared channel occupies the first quantity of resource elements within the slot; and
    adjusting an overhead of the physical sidelink control channel based at least in part on a value of the first quantity of resource elements occupied by the physical sidelink shared channel, wherein the overhead of the physical sidelink control channel is per slot, wherein the third quantity of resource elements occupied by the physical sidelink control channel is based at least in part on adjusting the overhead of the physical sidelink control channel.

11. The method of claim 7, further comprising:
    determining that the physical sidelink control channel and the physical sidelink shared channel are time division multiplexed,
    wherein the transport block size is based at least in part on determining that the physical sidelink control channel and the physical sidelink shared channel are time division multiplexed.

12. The method of claim 11, further comprising:
    determining an overhead of the physical sidelink control channel per physical resource block based at least in part on determining that the physical sidelink shared channel and the physical sidelink control channel are time division multiplexed,
wherein the transport block size and the third quantity of resource elements occupied by the physical sidelink control channel is based at least in part on the overhead of the physical sidelink control channel being per physical resource block.

13. The method of claim 11, further comprising:
determining a first quantity of symbols associated with the physical sidelink control channel or the physical sidelink shared channel, or both;
determining a second quantity of symbols exclusively including the physical sidelink control channel; and
excluding the quantity of symbols exclusively including the physical sidelink control channel from the second quantity of resource elements within the physical resource block or the first quantity of resource elements within the slot, or both,
wherein the transport block size is based at least in part on the excluding.

14. The method of claim 11, wherein the transport block size is based at least in part on an overhead of the physical sidelink control channel being per slot.

15. The method of claim 3, further comprising:
subtracting the fourth quantity of resource elements associated with the second-stage sidelink control information from the second quantity of resource elements within the physical resource block or the first quantity of resource elements within the slot, or both,
wherein the transport block size is based at least in part on the subtracting.

16. The method of claim 15, further comprising:
determining a control overhead associated with the second-stage sidelink control information based at least in part on a target code rate associated with a modulation coding scheme,
wherein the transport block size is based at least in part on the control overhead associated with the second-stage sidelink control information.

17. The method of claim 15, further comprising:
determining a control overhead associated with the second-stage sidelink control information; and
ignoring the control overhead associated with the second-stage sidelink control information,
wherein the transport block size is based at least in part on ignoring the control overhead associated with the second-stage sidelink control information.

18. The method of claim 15, further comprising:
identifying a modulation coding scheme for the sidelink communications; and
identifying a target code rate based at least in part on the modulation coding scheme for the sidelink communications,
wherein determining the fourth quantity of resource elements associated with the second-stage sidelink control information is based at least in part on the target code rate.

19. The method of claim 15, wherein transmitting the sidelink information via the physical sidelink shared channel comprises:
transmitting the second-stage sidelink control information via the physical sidelink shared channel based at least in part on the transport block size.

20. The method of claim 3, further comprising:
receiving an indication of an overhead value associated with the physical sidelink shared channel, wherein determining the second quantity of resource elements within the physical resource block is based at least in part on the indicated overhead value.

21. The method of claim 20, wherein:
the overhead value is an offset overhead value relative to the indicated demodulation reference signal pattern; and
determining the second quantity of resource elements within the physical resource block is based at least in part on the offset overhead value.

22. The method of claim 3, further comprising:
adjusting the first quantity of resource elements within the slot for the sidelink communications to a fifth quantity of resource elements within the slot for non-sidelink communications.

23. The method of claim 3, further comprising:
determining a channel state information reference signal overhead; and
refraining from using the channel state information reference signal overhead from determining the second quantity of resource elements within the physical resource block or determining the first quantity of resource elements within the slot, or both,
wherein the transport block size is based at least in part on the refraining.

24. A method for wireless communication by a first user equipment (UE), comprising:
receiving signaling comprising an indication of a demodulation reference signal pattern associated with a physical sidelink shared channel;
receiving, from a second UE, sidelink information via the physical sidelink shared channel; and
decoding the sidelink information based at least in part on a transport block size, wherein the transport block size is based on a first quantity of resource elements within a slot, wherein the first quantity of resource elements within the slot is based on a second quantity of resource elements within a physical resource block, and on a third quantity of resource associated with first-stage sidelink control information, and on a fourth quantity of resource elements associated with second-stage sidelink control information, and wherein the second quantity of resource elements within the physical resource block is based on the indicated demodulation reference signal pattern.

25. The method of claim 24, further comprising:
determining the second quantity of resource elements within the physical resource block, the second quantity of resource elements comprising an estimate quantity of resource elements associated with the physical resource block for sidelink communications,
wherein the transport block size is based at least in part on the second quantity of resource elements within the physical resource block.

26. The method of claim 25, further comprising:
determining a quantity of allocated physical resource blocks for sidelink communications; and
determining the first quantity of resource elements within the slot and associated with the allocated physical resource blocks for the sidelink communications based at least in part on the quantity of allocated physical resource blocks or the second quantity of resource elements within the physical resource block, or both,
wherein the transport block size is based at least in part on the first quantity of resource elements within the slot for the sidelink communications.

27. The method of claim 26, further comprising:
subtracting the third quantity of resource elements occupied by a physical sidelink control channel that is associated with the first-stage sidelink control information from the first quantity of resource elements within the slot,
wherein the transport block size is based at least in part on the subtracting.

28. A first user equipment (UE) for wireless communication, comprising:
one or more processors; and
memory coupled to the one or more processors, the one or more processors configured individually or collectively to cause the first UE to:
receive signaling comprising an indication of a demodulation reference signal pattern associated with a physical sidelink shared channel;
encode sidelink information based at least in part on a transport block size, wherein the transport block size is based on a first quantity of resource elements within a slot, wherein the first quantity of resource elements within the slot is based on a second quantity of resource elements within a physical resource block, and on a third quantity of resource elements associated with first-stage sidelink control information, and on a fourth quantity of resource elements associated with second-stage sidelink control information, and wherein the second quantity of resource elements within the physical resource block is based on the indicated demodulation reference signal pattern; and
transmit, to a second UE, the encoded sidelink information on the physical sidelink shared channel.

29. The first UE of claim 28, further comprising:
an antenna.

30. A first user equipment (UE) for wireless communication, comprising:
one or more processors; and
memory coupled to the one or more processors, the one or more processors configured individually or collectively to cause the first UE to:
receive signaling comprising an indication of a demodulation reference signal pattern associated with a physical sidelink shared channel;
receive, from a second UE, sidelink information via the physical sidelink shared channel; and
decode the sidelink information based at least in part on a transport block size, wherein the transport block size is based on a first quantity of resource elements within a slot, wherein the first quantity of resource elements within the slot is based on a second quantity of resource elements within a physical resource block, and on a third quantity of resource associated with first-stage sidelink control information, and on a fourth quantity of resource elements associated with second-stage sidelink control information, and wherein the second quantity of resource elements within the physical resource block is based on the indicated demodulation reference signal pattern.

\* \* \* \* \*